United States Patent
Cai et al.

(10) Patent No.: US 10,461,873 B1
(45) Date of Patent: Oct. 29, 2019

(54) DISAGGREGATED HYBRID OPTICAL TRANSPORT NETWORK, INTERNET PROTOCOL, AND ETHERNET SWITCHING SYSTEM

(71) Applicant: Fujitsu Limited, Kanagawa (JP)

(72) Inventors: Biaodong Cai, San Ramon, CA (US); Richard Dunsmore, McKinney, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/133,088

(22) Filed: Sep. 17, 2018

(51) Int. Cl.
*H04J 3/16* (2006.01)
*H04L 12/64* (2006.01)
(Continued)

(52) U.S. Cl.
CPC ............ *H04J 3/1658* (2013.01); *H04L 12/64* (2013.01); *H04L 45/24* (2013.01); *H04L 45/745* (2013.01); *H04L 47/12* (2013.01); *H04L 47/623* (2013.01); *H04L 47/6225* (2013.01); *H04L 47/6275* (2013.01); *H04L 49/1546* (2013.01); *H04L 49/25* (2013.01); *H04L 49/3045* (2013.01); *H04L 49/351* (2013.01); *H04B 10/00* (2013.01); *H04J 14/0212* (2013.01); *H04Q 2011/0016* (2013.01); *H04Q 2011/0086* (2013.01)

(58) Field of Classification Search
CPC ........ H04J 3/1658; H04L 12/64; H04L 45/24; H04L 45/745; H04L 47/12; H04L 47/6225; H04L 47/623; H04L 47/6275; H04L 49/1546; H04L 49/25; H04L 49/3045; H04L 49/351

USPC .......................................................... 398/45
See application file for complete search history.

(56) References Cited

U.S. PATENT DOCUMENTS 7,492,714 B1 * 2/2009 Liao .................... H04L 12/4604
370/235
8,340,088 B2 * 12/2012 Sindhu ................ H04L 49/1515
370/388

(Continued)

OTHER PUBLICATIONS

International Telecommunication Union, "Interfaces for the Optical Transport Network" ITU-T G.709/Y.1331 (Jun. 2016); 244 pages.

(Continued)

*Primary Examiner* — Abbas H Alagheband
(74) *Attorney, Agent, or Firm* — Baker Botts L.L.P.

(57) ABSTRACT

Systems and Methods for switching optical data units (ODUs) and Internet Protocol (IP) packets as Ethernet packets in an optical transport network (OTN), IP, and Ethernet switching system. The OTN, IP, and Ethernet switching system may include an Ethernet fabric having a set of M Ethernet switches each including a set of N switch ports, and a set of N input/output (IO) devices each including a set of W IO ports, a set of M Ethernet ports, an IO side packet processor (IOSP), and a fabric side packet processor (FSP). Each Ethernet switch may establish switch queues. Each IO device may establish a set of M hierarchical virtual output queues each including a set of N ingress-IOSP queues and ingress-virtual output queues, a set of W egress-IOSP queues, a set of M ingress-FSP queues, and a set of N hierarchical virtual input queues each including a set of N egress-FSP queues and egress-virtual input queues.

20 Claims, 16 Drawing Sheets

(51) Int. Cl.
*H04L 12/863* (2013.01)
*H04L 12/865* (2013.01)
*H04L 12/707* (2013.01)
*H04L 12/947* (2013.01)
*H04L 12/931* (2013.01)
*H04L 12/935* (2013.01)
*H04L 12/933* (2013.01)
*H04L 12/741* (2013.01)
*H04L 12/801* (2013.01)
*H04B 10/00* (2013.01)
*H04Q 11/00* (2006.01)
*H04J 14/02* (2006.01)

(56) References Cited

U.S. PATENT DOCUMENTS

| | | | | |
|---|---|---|---|---|
| 9,036,476 B2* | 5/2015 | Grandhi | | H04L 47/52 |
| | | | | 370/235 |
| 9,042,383 B2* | 5/2015 | Hendel | | H04L 49/505 |
| | | | | 370/392 |
| 9,148,367 B2* | 9/2015 | Kandaswamy | | H04L 69/22 |
| 9,276,870 B2* | 3/2016 | Testa | | H04L 47/10 |
| 9,774,461 B2* | 9/2017 | Srinivasan | | H04L 12/18 |
| 10,194,222 B2* | 1/2019 | Kim | | H04Q 11/0066 |
| 10,212,089 B1* | 2/2019 | Narayanan | | H04L 47/125 |
| 2005/0089054 A1* | 4/2005 | Ciancaglini | | H04L 49/3027 |
| | | | | 370/412 |
| 2006/0140226 A1* | 6/2006 | Ho | | H04J 3/08 |
| | | | | 370/539 |
| 2010/0061391 A1* | 3/2010 | Sindhu | | H04L 49/1515 |
| | | | | 370/412 |
| 2013/0201826 A1* | 8/2013 | Testa | | H04L 47/10 |
| | | | | 370/230 |
| 2017/0295101 A1* | 10/2017 | Hira | | H04L 43/0876 |
| 2017/0311060 A1* | 10/2017 | Cai | | H04L 45/745 |

OTHER PUBLICATIONS

International Telecommunication Union, "Architecture of Optical Transport Networks" ITU-T G.872 (Jan. 2017); 68 pages.

* cited by examiner

| METADATA 430 | | | | |
|---|---|---|---|---|
| PHS 423 | INTERNAL TRAFFIC CLASS 490 | INTERNAL FLOW ID 492 | EGRESS PORT 494 | EGRESS IO BLADE 496 | ECMP/ENET SW# 498 |

| METADATA 434 | | | | |
|---|---|---|---|---|
| PHS 423 | INTERNAL TRAFFIC CLASS 490 | INTERNAL FLOW ID 492 | EGRESS PORT 494 | EGRESS IO BLADE 496 |

| METADATA 438 | | | |
|---|---|---|---|
| PHS 423 | INTERNAL TRAFFIC CLASS 490 | INTERNAL FLOW ID 492 | EGRESS PORT 494 |

FIG. 4F

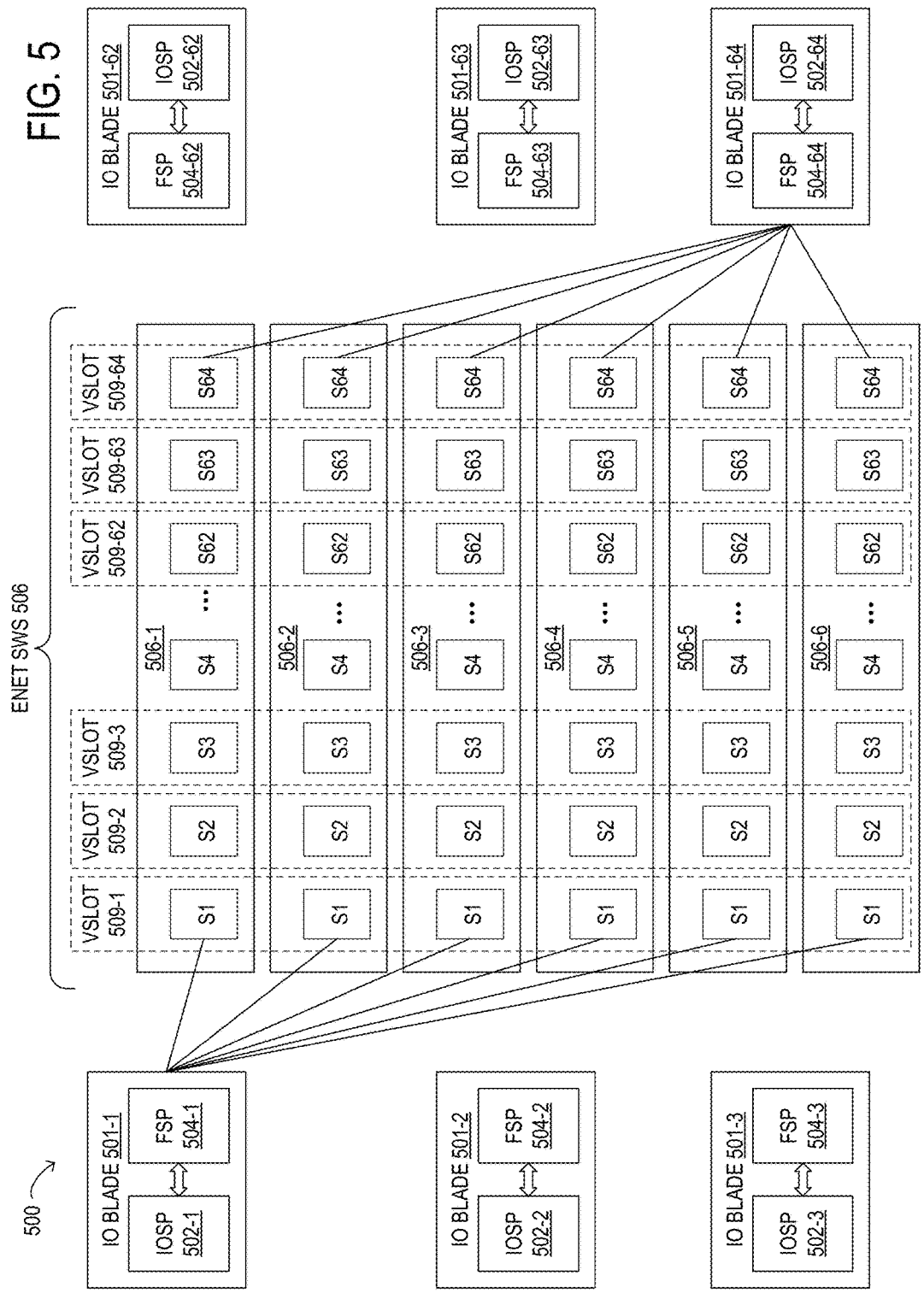

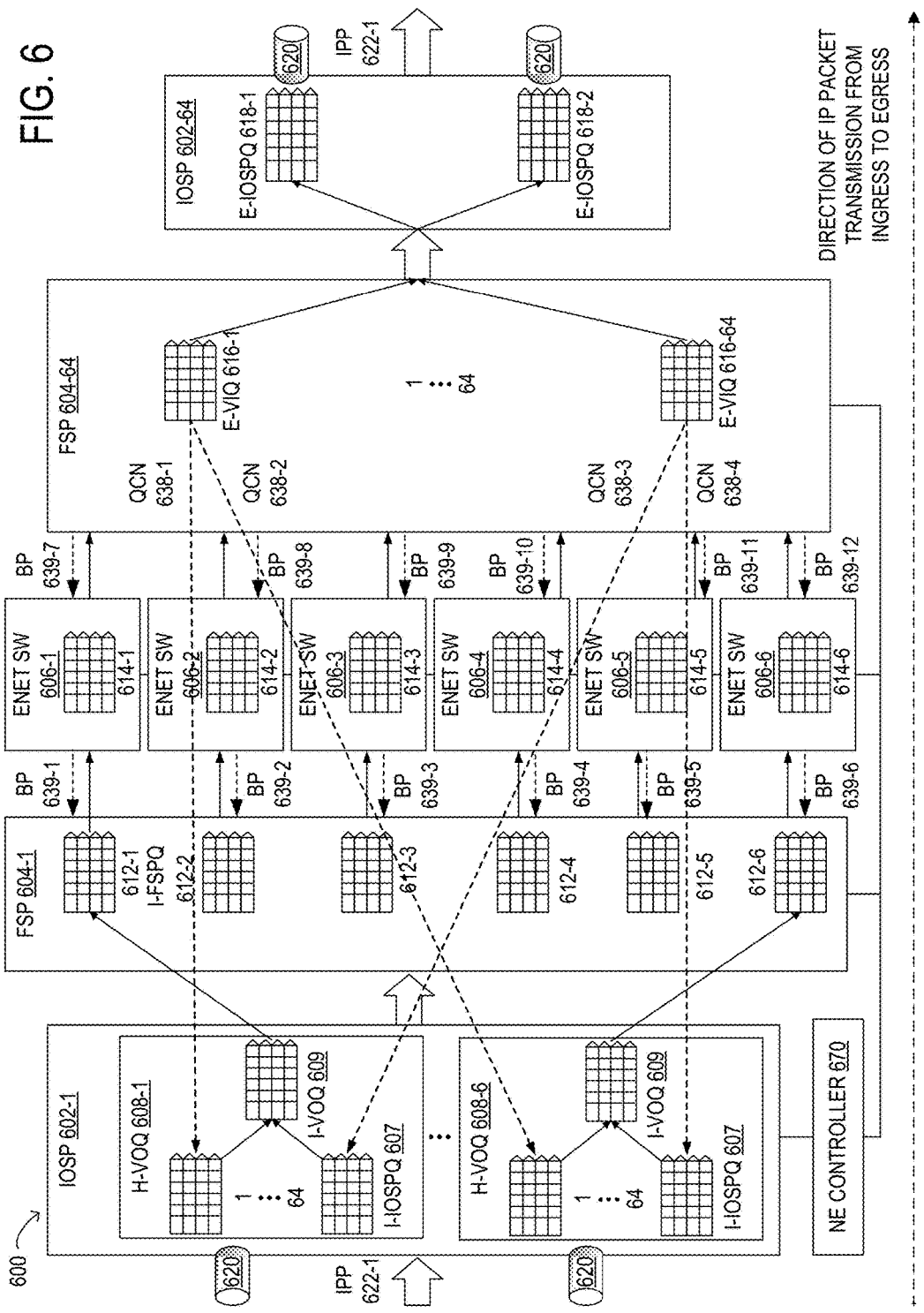

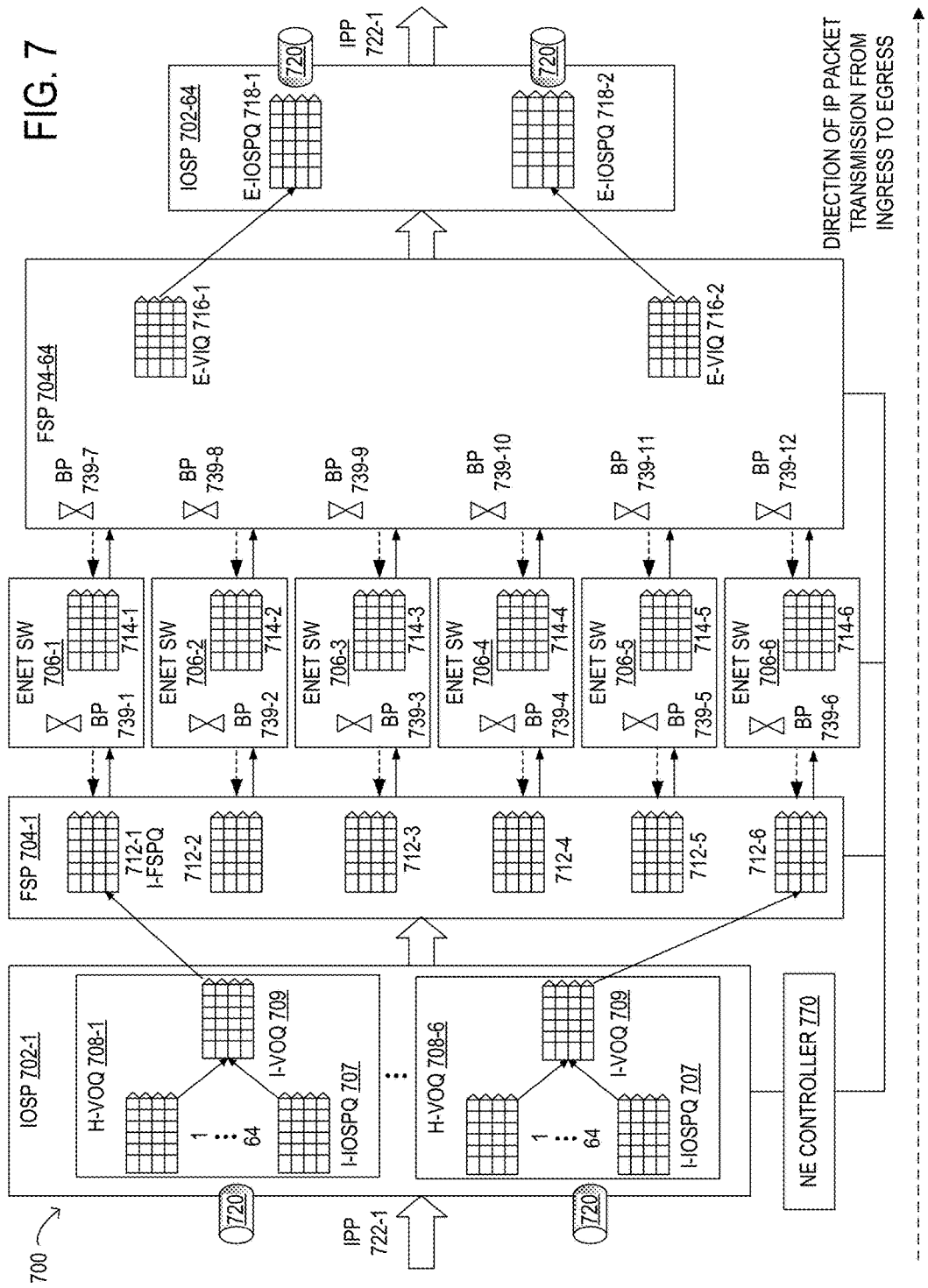

US 10,461,873 B1

DISAGGREGATED HYBRID OPTICAL TRANSPORT NETWORK, INTERNET PROTOCOL, AND ETHERNET SWITCHING SYSTEM

BACKGROUND

Field of the Disclosure

The present disclosure relates generally to wide area network communication networks and, more particularly, to a disaggregated hybrid optical transport network (OTN), Internet Protocol (IP), and Ethernet switching system.

Description of the Related Art

Telecommunication, cable television and data communication systems use optical transport networks (OTN) to rapidly convey large amounts of information between remote points. In an OTN, information is conveyed in the form of optical signals through optical fibers, where multiple sub-channels may be carried within an optical signal. OTNs may also include various network elements, such as amplifiers, dispersion compensators, multiplexer/demultiplexer filters, wavelength selective switches, optical switches, couplers, etc. configured to perform various operations within the network.

OTNs may be reconfigured to transmit different individual channels using, for example, optical add-drop multiplexers (OADMs). In this manner, individual channels (e.g., wavelengths) may be added or dropped at various points along an optical network, enabling a variety of network configurations and topologies.

Furthermore, typically, an optical transport network (OTN) switch is used to centrally perform electrical switching of the sub-channels carried within an optical signal to different destinations.

SUMMARY

In one embodiment, a disclosed optical transport network (OTN), Internet Protocol (IP), and Ethernet switching system may include an Ethernet fabric including a set of M Ethernet switches each comprising a set of N switch ports. A variable i may have a value ranging from 1 to M to denote the ith Ethernet switch of the set of M Ethernet switches and a variable j may have a value ranging from 1 to N to denote the jth switch port of the set of N switch ports. The OTN and IP and Ethernet switching system may also include a set of O input/output (IO) devices each may include a set of M Ethernet ports. A variable u may have a value ranging from 1 to O to denote the uth IO device of the set of O IO devices. The jth Ethernet port of the uth IO device may be connected to the uth switch port of the ith Ethernet switch. The OTN and IP and Ethernet switching system may further include an IO side packet processor (IOSP). The IOSP may establish a set of M hierarchical virtual output queues (H-VOQs) each comprising a set of N ingress-IOSP queues (I-IOSPQs) and I-VOQs. The IOSP may also create M virtual lanes (v-lanes) including a first v-lane and a second v-lane, each of the M v-lanes may correspond to a respective H-VOQ of the set of M H-VOQs. The IOSP may further create A equal cost multi-path (ECMP) pipes including B ECMP pipes and C ECMP pipes, each of the A ECMP pipes may connect to one of the M v-lanes, each of the B ECMP pipes may connect to the first v-lane, and each of the C ECMP pipes may connect to the second v-lane. The IOSP may also generate micro-flows by 5-Tuple look-up based on packet header information of a received IP packet and an I-IOSP forwarding information base (FIB). The IOSP may further distribute the micro-flows into the A ECMP pipes. The IOSP may also queue the IP packet including first metadata to an I-IOSPQ of an H-VOQ that may correspond to an egress IO device and a switch number of a corresponding Ethernet switch based on the micro-flows and an identified micro-flow for an ECMP hash key in a ECMP pipe hash of the IOSP.

In any of the disclosed embodiments of the OTN, IP, and Ethernet switching system, the number O of the set of O IO devices may be equal to the number N of the set of N Ethernet ports, the number B of the B ECMP pipes may be greater than the number C of the C ECMP pipes, and packet traffic bandwidth of the first v-lane may be greater than the packet traffic bandwidth of the second v-lane.

In any of the disclosed embodiments of the OTN, IP, and Ethernet switching system, the M v-lanes may further include a third v-lane. The A ECMP pipes may further include D ECMP pipes, each of the D ECMP pipes may corresponds to the third v-lane. The number C of the C ECMP pipes may be greater than the number D of the D ECMP pipes, and the packet traffic bandwidth of the second v-lane may be greater than the packet traffic bandwidth of the third v-lane.

In any of the disclosed embodiments of the OTN, IP, and Ethernet switching system, the number O of the set of O IO devices may be equal to the number N of the set of N Ethernet ports. The M v-lanes may further include a third v-lane. The A ECMP pipes may further include D ECMP pipes, each of the D ECMP pipes may correspond to the third v-lane. The number B of the B ECMP pipes may be equal to the number C of the C ECMP pipes, the number C of the C ECMP pipes may be equal to the number D of the C ECMP pipes, packet traffic bandwidth of the first v-lane may be equal to the packet traffic bandwidth of the second v-lane, and packet traffic bandwidth of the second v-lane may be equal to the packet traffic bandwidth of the third v-lane.

In any of the disclosed embodiments of the OTN, IP, and Ethernet switching system, the OTN and IP and Ethernet switching system may also include a set of Q optical transport network leaf (O-leaf) plug-in universal (PIU) modules each comprising a set of L Ethernet ports. A variable v may have a value ranging from 1 to Q to denote the vth O-leaf PIU module, a variable z may have a value ranging from 1 to L to denote the zth Ethernet port, and a variable g may have a value ranging from 1+H to M to denote the gth Ethernet switch. The zth Ethernet port of the set of L Ethernet ports of the vth O-leaf PIU module may be connected to the O+vth switch port of the set of N switch ports of the gth Ethernet switch.

In any of the disclosed embodiments of the OTN, IP, and Ethernet switching system, the set of Q O-leaf PIU modules may include a first O-leaf PIU module and a second O-leaf PIU module. The first O-leaf PIU module may establish a first optical data unit (ODU) switched connection from the first O-leaf PIU module to the second O-leaf PIU module via the subset of L Ethernet switches of the M Ethernet switches, select a first sequential order of the subset of L Ethernet switches, receive a first ODU at the first O-leaf PIU module and generate a second Ethernet packet corresponding to the first ODU, wherein the first ODU is for transmission via the first ODU switched connection, and transmit the second Ethernet packet from a first Ethernet port of the set of L Ethernet ports of the first O-leaf PIU module, wherein the first Ethernet port is selected based on the first sequential order.

In any of the disclosed embodiments of the OTN, IP, and Ethernet switching system, each Ethernet switch of the set of M Ethernet switches may establish switch queues. The first Ethernet switch of the set of M Ethernet switches may identify an egress port of the set of N switch ports of the first Ethernet switch based on packet header information of the received first Ethernet packet including an egress port number of first metadata, the first metadata, and a first MAC header from an ingress IO device of the set of O IO devices, generate a second MAC header based on the egress port number and an egress IO device of the set of O IO devices of the first metadata, generate second metadata from the first metadata by removing the egress IO device, queue the packet data, the second metadata, and the second MAC header to switch queues of the first Ethernet switch, de-queue the packet data, the second metadata, and the second MAC header from the switch queues using a scheduling algorithm, and transmit a second Ethernet packet including the de-queued packet data, the second metadata, and the second MAC header to the egress IO device via the egress port of the first Ethernet switch.

In any of the disclosed embodiments of the OTN, IP, and Ethernet switching system, each IO device may also include a set of W IO ports. A variable x having a value ranging from 1 to W to denote the xth IO port of the set of W IO ports. The IOSP may establish a set of W egress-IOSP queues (E-IOSPQs). The xth E-IOSPQ may correspond to an xth IO port of the set of W IO ports of the IO device. The IOSP may also de-queue the IP packet including the first metadata from the I-VOQs of the H-VOQ using a scheduling algorithm and transmit the de-queued IP packet including the first metadata to the FSP of the ingress IO device. The FSP may also establish a set of M ingress-FSP queues (I-FSPQs), wherein the ith I-FSPQ corresponds to the ith Ethernet switch, generate a first Ethernet packet including the packet data of the IP packet, second metadata based on the first metadata, and a first media access control (MAC) header, queue the first Ethernet packet to an I-FSPQ corresponding to the switch number of the first metadata, de-queue the first Ethernet packet including the packet data of the IP packet, the second metadata, and the first MAC header from the I-FSPQ using the scheduling algorithm, and transmit the de-queued first Ethernet packet to the egress IO device via an Ethernet switch corresponding to the switch number.

In any of the disclosed embodiments of the OTN, IP, and Ethernet switching system, an FSP of an egress IO device of the set of O IO devices may establish a set of O hierarchical virtual input queues (H-VIQs) each comprising a set of O egress-FSP queues (E-FSPQs) and E-VIQs. The uth H-VIQ may correspond to the uth IO device and the uth E-FSPQ of the uth H-VIQ may correspond to the uth IO device. The FSP of the egress IO device may receive a first Ethernet packet including the packet data of the IP packet, second metadata, and a first MAC header at an Ethernet port of the egress IO device, determine an ingress IO device of the set of O IO devices based on an E-FSP FIB of the FSP and an internal flow ID of the second metadata of the first Ethernet packet, queue the packet data and the second metadata to an E-FSPQ of an H-VIQ corresponding respectively to the ingress IO device and the IO port of the egress IO device, de-queue the packet data and the second metadata from the E-VIQs of the H-VIQ using a scheduling algorithm, and transmit the de-queued packet data and the second metadata to an IOSP of the egress IO device. The IOSP of the egress IO device may generate the IP packet including the received packet data and packet header information of the second metadata from the received packet data and the second metadata, queue the IP packet to an E-IOSPQ of the set of W E-IOSPQs corresponding to the egress port of the egress IO device of the second metadata, de-queue the IP packet data from the E-IOSPQ using the scheduling algorithm, and transmit the IP packet via the egress port.

In any of the disclosed embodiments of the OTN, IP, and Ethernet switching system, each I-IOSPQ of the set of O I-IOSPQs of each H-VOQ of the set M H-VOQs of an IOSP of each IO device of the set of O IO devices may comprise a set of P priority I-IOSPQs. Packet data in each I-IOSPQ may be de-queued using the scheduling algorithm. The I-VOQs of each H-VOQ of the set M H-VOQs of the IOSP of each IO device of the set of O IO devices may comprise a set of P priority I-VOQs. Packet data in the I-VOQs may be de-queued using the scheduling algorithm. Each I-FSPQ of the set of M I-FSPQs of the FSP of each IO device of the set of O IO devices may comprise a set of P priority I-FSPQs. Packet data in each I-FSPQ may be de-queued using the scheduling algorithm. Each E-FSPQ of the set of O E-FSPQs of each H-VIQs of the set O H-VIQs of an FSP of each IO device of the set of O IO devices may comprise a set of P Priority E-FSPQs, wherein packet data in each E-FSPQ is de-queued using the scheduling algorithm. The E-VIQs of each H-VIQ of the set N H-VIQs of the FSP of each IO device of the set of O IO devices may comprise a set of P priority E-VIQs. Packet data in the E-VIQs may be de-queued using the scheduling algorithm. The scheduling algorithm may comprise a strict priority algorithm, a weighted fair queuing algorithm, a weighted round robin algorithm, a strict priority and weighted fair queuing algorithm, or a strict priority weighted round robin algorithm.

In any of the disclosed embodiments of the OTN, IP, and Ethernet switching system, an IOSP of each IO device of the set of O IO devices may establish quantize congestion notification (QCN) between each I-IOSPQ of each H-VOQ of the set of M H-VOQs of the IOSP of each IO device of the set of O IO devices and each corresponding E-FSPQ of each H-VIQ of a set of O H-VIQs of an FSP of each IO device of the set of O IO devices. Packet data in each I-IOSPQ of the set of O I-IOSPQs of each H-VOQ of the set M H-VOQs of the IOSP of each IO device of the set of O IO devices may be de-queued using a scheduling algorithm based on the established QCN.

In any of the disclosed embodiments of the OTN, IP, and Ethernet switching system, an IOSP of each IO device of the set of O IO devices may establish priority-based flow control (PFC) between each I-FSPQ of a subset of R I-FSPQs of the M I-FSPQs of the FSP of each IO device of the set of O IO devices and switch queues of a corresponding subset of R Ethernet switches of the set of M Ethernet switches. A variable y may have a value ranging from 2 to N−1 to denote the yth I-FSPQ of the subset of R I-FSPQs. Packet data in each I-FSPQ of the subset of R I-FSPQs of the M I-FSPQs of the FSP of each IO device of the set of O IO devices may be de-queued using a scheduling algorithm based on the established PFC.

In any of the disclosed embodiments of the OTN, IP, and Ethernet switching system, the OTN and IP and Ethernet switching system may also include a virtual switch fabric including a set of N virtual line card slots each may comprise a logical aggregation of the jth switch port of the set of N switch ports of each of the set of M Ethernet switches. The uth IO device of the set of O IO devices may be associated with only the uth virtual line card slot of the N virtual line card slots. The with O-leaf PIU module of the set of Q O-leaf PIU module may be associated with only the O+vth virtual line card slot of the N virtual line card slots.

In any of the disclosed embodiments of the OTN, IP, and Ethernet switching system, an FSP of an egress IO device of the set of O IO devices may establish a set of O E-VIQs. The uth E-VIQ may correspond to the uth IO device. The FSP of the egress IO device may receive packet data and second metadata at an Ethernet port of the egress IO device, determine an ingress IO device of the set of O IO devices based on an E-FSP FIB of the FSP and an internal flow ID of the second metadata, queue the packet data and the second metadata to an E-VIQs corresponding respectively to the IO port of the egress IO device, de-queue the packet data and the second metadata from the E-VIQs using a scheduling algorithm, and transmit the de-queued packet data and the second metadata to an IOSP of the egress IO device. The IOSP of the egress device may queue the packet data and packet header information of the second metadata to an E-IOSPQ of a set of W E-IOSPQs corresponding to the egress port of the egress IO device of the second metadata, de-queue the packet data and the packet header information from the E-IOSPQ using the scheduling algorithm, and transmit the packet data and the packet header information via the egress port.

In any of the disclosed embodiments of the OTN, IP, and Ethernet switching system, an IOSP of each IO device of the set of O IO devices may establish quantize congestion notification (QCN) between each I-IOSPQ of each H-VOQ of the set of M H-VOQs of the IOSP of each IO device of the set of O IO devices and each E-VIQ of a set of O E-VIQs of an FSP of each IO device of the set of O IO devices. Packet data in each I-IOSPQ of the set of O I-IOSPQs of each H-VOQ of the set M H-VOQs of the IOSP of each IO device of the set of O IO devices may be de-queued using a scheduling algorithm based on the established QCN.

In any of the disclosed embodiments of the OTN, IP, and Ethernet switching system, an IOSP of each IO device of the set of O IO devices may establish priority-based flow control (PFC) between each I-FSPQ of a subset of R I-FSPQs of the M I-FSPQs of the FSP of each IO device of the set of O IO devices and switch queues of a corresponding subset of R Ethernet switches of the set of M Ethernet switches. A variable y may have a value ranging from 2 to O−1 to denote the yth I-FSPQ of the subset of R I-FSPQs. Packet data in each I-FSPQ of the subset of R I-FSPQs of the M I-FSPQs of the FSP of each IO device of the set of O IO devices may be de-queued using a scheduling algorithm based on the established PFC.

In any of the disclosed embodiments of the OTN, IP, and Ethernet switching system, an FSP of an egress IO device of the set of O IO devices may establish a set of W E-VIQs. A variable x may have a value ranging from 1 to W to denote the xth E-VIQs of the set of W E-VIQ. The FSP of the egress IO device may receive packet data and second metadata at an Ethernet port of the egress IO device, determine an ingress IO device of the set of O IO devices based on an E-FSP FIB of the FSP and an internal flow ID of the second metadata, queue the packet data and the second metadata to an E-VIQs corresponding respectively to an IO port of the egress IO device, de-queue the packet data and the second metadata from the E-VIQs using a scheduling algorithm, and transmit the de-queued packet data and the second metadata to an IOSP of the egress IO device. The IOSP may queue the packet data and packet header information of the second metadata to an E-IOSPQ of a set of W E-IOSPQs corresponding to the egress port of the egress IO device of the second metadata, de-queue the packet data and the packet header information from the E-IOSPQ using the scheduling algorithm, and transmit the packet data and the packet header information via the egress port.

In any of the disclosed embodiments of the OTN, IP, and Ethernet switching system, an IOSP of each IO device of the set of O IO devices may establish priority-based flow control (PFC) between each I-FSPQ of M I-FSPQs of the FSP of each IO device of the set of O IO devices and switch queues of a corresponding set of M Ethernet switches. Packet data in each I-FSPQ of the M I-FSPQs of the FSP of each IO device of the set of O IO devices may be de-queued using a scheduling algorithm based on the established PFC.

In a second embodiment, a disclosed method may include, in an optical transport network (OTN), Internet Protocol (IP), and Ethernet switching system may include an Ethernet fabric including a set of M Ethernet switches each comprising a set of N switch ports. A variable i may have a value ranging from 1 to M to denote the ith Ethernet switch of the set of M Ethernet switches and a variable j may have a value ranging from 1 to N to denote the jth switch port of the set of N switch ports. The OTN and IP and Ethernet switching system may also include a set of O input/output (IO) devices each including a set of M Ethernet ports. A variable u may have a value ranging from 1 to O to denote the uth IO device of the set of O IO devices. The jth Ethernet port of the uth IO device may be connected to the uth switch port of the ith Ethernet switch. The OTN and IP and Ethernet switching system may further include an IO side packet processor (IOSP), establishing, by the IOSP, a set of M hierarchical virtual output queues (H-VOQs) each including a set of N ingress-IOSP queues (I-IOSPQs) and I-VOQs. The method may also include creating, by the IOSP, M virtual lanes (v-lanes) corresponding to a respective H-VOQ of the set of M H-VOQs, the M v-lanes may include a first v-lane and a second v-lane. The method may further include creating, by the IOSP, A equal cost multi-path (ECMP) pipes including B ECMP pipes and C ECMP pipes, each of the A ECMP pipes may connect to one of the M v-lanes, each of the B ECMP pipes may connect to the first v-lane, and each of the C ECMP pipes may connect to the second v-lane. The method may also include generating, by the IOSP, micro-flows by 5-Tuple look-up based on packet header information of a received IP packet and an I-IOSP forwarding information base (FIB). The method may further include distributing, by the IOSP, the micro-flows into the A ECMP pipes. The method may also include queueing, by the IOSP, the IP packet including first metadata to an I-IOSPQ of an H-VOQ corresponding to an egress IO device and a switch number of a corresponding Ethernet switch based on the micro-flows and an identified micro-flow for an ECMP hash key in a ECMP pipe hash of the IOSP.

In any of the disclosed embodiments of the method, the method may also include, in the OTN, IP, and Ethernet switching system may further include a set of Q optical transport network leaf (O-leaf) plug-in universal (PIU) modules including a first O-leaf PIU module and a second O-leaf PIU module, each O-leaf PIU module of the set of Q O-leaf PIU modules may include a set of L Ethernet ports. A variable v may have a value ranging from 1 to Q to denote the vth O-leaf PIU module, a variable z may have a value ranging from 1 to L to denote the zth Ethernet port, and a variable g may have a value ranging from 1+H to M to denote the gth Ethernet switch. The zth Ethernet port of the set of L Ethernet ports of the vth O-leaf PIU module may be connected to the O+vth switch port of the set of N switch ports of the gth Ethernet switch. The method may further include establishing, by the first O-leaf PIU module, a first optical data unit (ODU) switched connection from the first O-leaf PIU module to the second O-leaf PIU module via the subset of L Ethernet switches of the M Ethernet switches. The method may also include selecting, by the first O-leaf PIU module, a first sequential order of the subset of L Ethernet switches. The method may further include receiving, by the first O-leaf PIU module, a first ODU at the first O-leaf PIU module and generating a second Ethernet packet corresponding to the first ODU. The first ODU may be for transmission via the first ODU switched connection. The method may also include transmitting, by the first O-leaf PIU module, the second Ethernet packet from a first Ethernet port of the set of L Ethernet ports of the first O-leaf PIU module. The first Ethernet port may be selected based on the first sequential order.

BRIEF DESCRIPTION OF THE DRAWINGS

For a more complete understanding of the present invention and its features and advantages, reference is now made to the following description, taken in conjunction with the accompanying drawings, in which:

FIGS. 4A, 4B, 4C, 4D, 4E, and 4F are block diagrams of a WACC disaggregated networking switching system;

FIG. 5 is a block diagram of a WACC disaggregated networking switching system including virtual slots;

FIG. 6 is a block diagram of another WACC disaggregated networking switching system;

FIG. 7 is a block diagram of yet another WACC disaggregated networking switching system;

Figure 1:
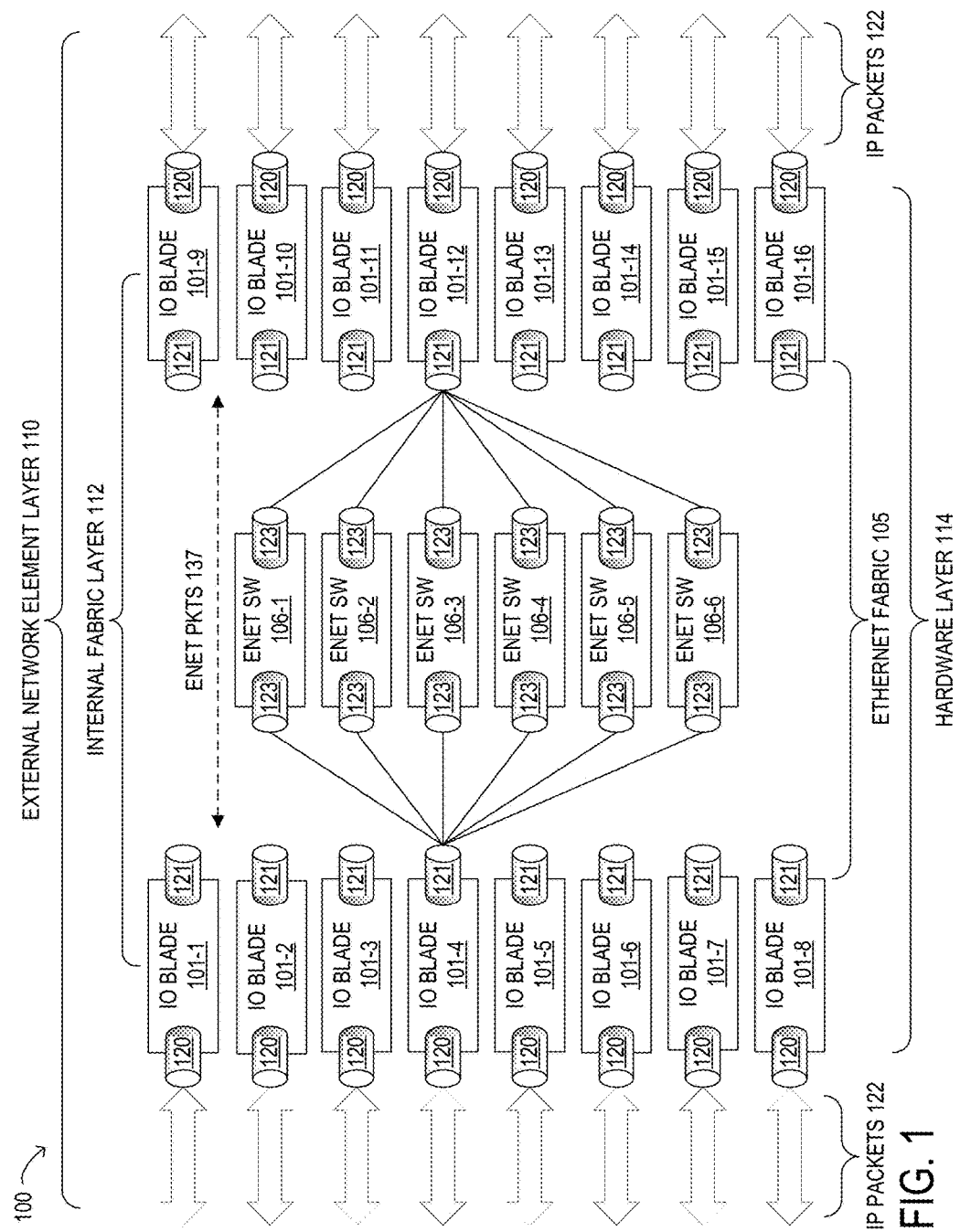
FIG. 1 is a block diagram of selected elements of an embodiment of a wide area common carrier (WACC) disaggregated networking switching system.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Telecommunication, cable television and data communication systems use wide area common carrier (WACC) networks to rapidly convey large amounts of information between remote points. Typically, these networks utilize monolithic wide area network (WAN) routers and switches. These Monolithic WAN routers and switches have sophisticated internal flow control, fine granularity traffic management, and deep buffers required to support wide area common carrier networking. However, these systems are very costly to develop. Development to scale these systems up or down is even more costly. Although these designs allow reuse of line cards, these systems require multiple chassis and associated multiple iterations of central processing units (CPUs) and switch fabrics to scale from small to medium to large to ultra-large systems. In addition, it is difficult for these design development efforts to meet the rapid development and cost curve of data center single chip Ethernet switches. Typical data center fabrics using single chip Ethernet switches are modular and able to scale from very small to very large WANs on rapid development and cost curves. However, these data center fabrics using single chip Ethernet switches do not have the sophisticated internal flow control, fine granularity traffic management, and deep buffer required to support wide area common carrier networking. In fact, the data center bridging (DCB) enhancements to the Ethernet local area network communication protocol for use in data center environments explicitly state that they will only work for a network radius of 2 km or less.

As will be described in further detail herein, the inventors of the present disclosure have discovered systems and methods for switching optical data units (ODUs) and IP packets as Ethernet packets in a disaggregated hybrid optical transport network (OTN), Internet Protocol (IP), and Ethernet switching system. In the present solution, the disaggregated hybrid OTN, IP, and Ethernet switching system includes a network element (NE) controller, a set of input/output (IO) blades, an Ethernet fabric having a set of Ethernet switches, and deep packet buffers. The disaggregated hybrid OTN, IP, and Ethernet switching system may apply a traffic allocation algorithm on each IO blade so that the Ethernet traffic transmitted over each Ethernet switch of the set of Ethernet switches may be the same as or different than the Ethernet traffic transmitted over the other Ethernet switches of the set of Ethernet switches. The disaggregated hybrid OTN, IP, and Ethernet switching system utilizes existing protocols and extensive queuing capability of the internal fabric layer to build an internal fabric network that provides multi-path forwarding, virtual output queues, virtual input queues, internal fine granularity flow control, and traffic management. The NE controller manages the IO blades, the Ethernet fabric, and the internal fabric network. The NE controller may interact with a cloud-based transport and service layer control plane. External to the disaggregated hybrid OTN, IP, and Ethernet switching system, packet behavior including packet forwarding and routing may be controller by a cloud-based control plane to provide services to applications where the disaggregated hybrid OTN, IP, and Ethernet switching system is deployed.

The disaggregated hybrid OTN, IP, and Ethernet switching system provides the sophisticated internal flow control, fine granularity traffic management, and deep buffer required for wide area common carrier networking. The disaggregated hybrid OTN, IP, and Ethernet switching system utilizes single chip Ethernet switches, which significantly lowers development costs. The disaggregated hybrid OTN, IP, and Ethernet switching system is modular and ultra-scalable from very small to ultra-large and captures the rapid development and cost curve of data center single chip Ethernet switches.

Referring now to FIG. 1, a block diagram of selected elements of an embodiment of a wide area common carrier (WACC) disaggregated networking switching system 100 for IP and Ethernet switching is illustrated. Elements of WACC disaggregated networking switching system 100 may include, but are not limited to, a set of N input/output (IO) blades 101 and an Ethernet fabric 105 including a set of M Ethernet switches 106. An IO blade also referred herein as an IO device. A variable i may have a value ranging from 1 to M to denote the ith Ethernet switch 106 of the set of M Ethernet switches 106 and a variable j having a value ranging from 1 to N to denote the jth IO blade 101 of the set of N IO blades 101. Each IO blade 101 may include at least one IO port 120 and a set of M Ethernet ports 121. Each Ethernet switch 106 may include a set of N switch ports 123. As shown in FIG. 1, N has the value 16, M has the value 6, the set of 16 IO blades 101 includes IO blades 101-1, 101-2, 101-3, 101-4, 101-5, 101-6, 101-7, 101-8, 101-9, 101-10, 101-11, 101-12, 101-13, 101-14, 101-15, and 101-16, and the set of 6 Ethernet switches 106 includes Ethernet switches 106-1, 106-2, 106-3, 106-4, 106-5, and 106-6. Although FIG. 1 only shows that each of the 6 Ethernet ports of IO device 101-4 are connected to a respective one switch port of each Ethernet switch 106 of Ethernet switches 106, and each of the 6 Ethernet ports of IO device 101-12 are connected to a respective one switch port of each Ethernet switch 106 of Ethernet switches 106, each of the M Ethernet ports of each IO device 101 may be connected to a respective switch port of the N switch ports of each Ethernet switch 106. The ith Ethernet port of the jth IO device 101 may be connected to the jth switch port of the ith Ethernet switch 106. As shown in FIG. 1, each IO blade 101 may transmit or receive IP packets 122 at a respective IO port 120. Each IO blade 101 may transmit Ethernet packets 137 to another IO blade 101 over Ethernet fabric 105. Each IO blade 101 may receive Ethernet packets 137 from another IO blade 101 over Ethernet fabric 105.

As shown in FIG. 1, an external network element layer 110 of WACC disaggregated networking switching system 100 is the external visible switching system, which may be running external visible networking protocols including Internet Protocol (IP), transmission control protocol (TCP), user datagram protocol (UDP), or other types of networking protocols. An internal fabric layer 112 of WACC disaggregated networking switching system 100 may comprise Ethernet fabric 105 and IO blades 101. Internal fabric layer 112 may use existing protocols and a vast queuing capability of IO blades 101 and Ethernet switches 106 to build an internal fabric network that may be equivalent to what is supported in a monolithic switch fabric. Internal fabric layer 112 of WACC disaggregated networking switching system 100 may provide multi-path, virtual output queue (VOQ), virtual input queue (VIQ), internal flow control, fine granularity traffic management, and deep buffers required for WACC networking. Hardware layer 114 comprises Ethernet switches 106, IO blades 101, and interconnects between Ethernet switches 106 and IO blades 101. The interconnects may be 100 Gigabit Ethernet (100 GbE) copper or fiber interconnects including copper direct attach cables (DACs) or fiber active optical cables (AOCs). Ethernet switches 106 are aligned in parallel to form a fabric, parallel fabric. In FIG. 1, six Ethernet switches 106 and sixteen IO blades 101 are shown. In one or more other embodiments, WACC disaggregated networking switching system 100 may comprise two or more Ethernet switches 106 and two or more IO blades 101.

Figure 2:
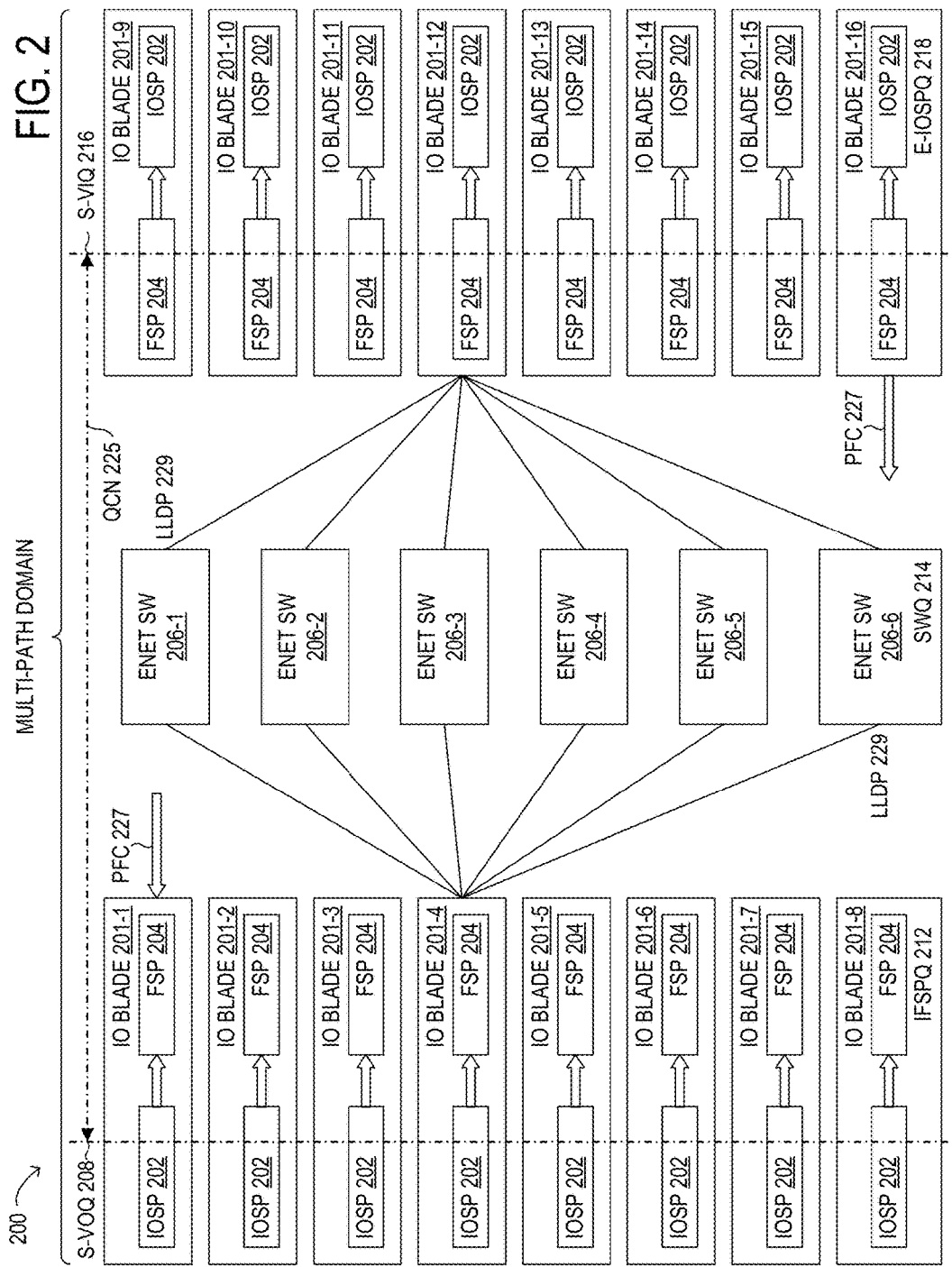
FIG. 2 is a block diagram of selected elements of an embodiment of a wide area common carrier (WACC) disaggregated networking switching system including a multi-path domain.

Referring now to FIG. 2, a block diagram of selected elements of an embodiment of a WACC disaggregated networking switching system 200 including a multi-path domain for IP and Ethernet switching is illustrated. Further details of IO blades 101 and internal fabric layer 112 previously described with reference to FIG. 1 are shown in WACC disaggregated networking switching system 200 of FIG. 2. Elements of WACC disaggregated networking switching system 200 may include, but are not limited to, a set of N IO blades 201 and a set of M Ethernet switches 206. A variable i may have a value ranging from 1 to M to denote the ith Ethernet switch 206 of the set of M Ethernet switches 206 and a variable j having a value ranging from 1 to N to denote the jth IO blade 201 of the set of N IO blades 201. Each IO blade 201 may include an IO side packet processor (IOSP) 202, a fabric side packet processor (FSP) 204, and a set of M Ethernet ports (not shown). Each Ethernet switch 206 may include a set of N switch ports (not shown). As shown in FIG. 2, N has the value 16, M has the value 6, the set of 16 IO blades 201 includes IO blades 201-1, 201-2, 201-3, 201-4, 201-5, 201-6, 201-7, 201-8, 201-9, 201-10, 201-11, 201-12, 201-13, 201-14, 201-15, and 201-16, and the set of 6 Ethernet switches 206 includes Ethernet switches 206-1, 206-2, 206-3, 206-4, 206-5, and 206-6. Although FIG. 2 only shows that each of the 6 Ethernet ports of IO device 201-4 are connected to a respective one switch port of each Ethernet switch 206 of Ethernet switches 206, and each of the 6 Ethernet ports of IO device 201-12 are connected to a respective one switch port of each Ethernet switch 206 of Ethernet switches 206, each of the M Ethernet ports of each IO device 201 may be connected to a respective switch port of the N switch ports of each Ethernet switch 206. The ith Ethernet port of the jth IO device 201 may be connected to the jth switch port of the ith Ethernet switch 206.

An internal fabric layer of WACC disaggregated networking switching system 200 may comprise Ethernet switches 206 and IO blades 201. The internal fabric layer may provide a multi-path routing function, either layer 2 or layer 3, that allows packet streams to fully utilize the available bandwidth amongst multiple parallel Ethernet switches 206 while preserving the order of sequence for each packet flow. The internal fabric layer may also provide internal flow control and traffic management, which may achieve the same function as the backpressure and flow control from a monolithic fabric.

The internal fabric layer may be built using a process similar to an internet engineering task force (IETF) transparent interconnection of lots of links (TRILL) or an institute of electronic and electrical engineers (IEEE) short path bridging (SPB) equal cost multi-path (ECMP) approach to establish the multi-path over fabric, and use data center bridging (DCB) tools including quantize congestion notification (QCN) and priority-based flow control (PFC) to provide constructs that mimic the virtual output queue (VOQ), virtual input queue (VIQ), and backpressure mechanisms that commonly exists on large scale monolithic switches. As shown in FIG. 2, IOSPs 202 of IO blades 201-1 through 201-8 provide system virtual output queues (S-VOQs) 208, FSPs 204 of IO blades 201-9 through 201-16 provide system virtual input queues (S-VIQs) 216, and WACC disaggregated networking switching system 200 provides QCN 225 between S-VIQ 216 and S-VOQ 208.

When one or more IO blades 201-9 through 201-16 have congestion within the IO blades 201-9 through 201-16 or within a processing core of the IO blades 201-9 through 201-16, the egress FSP 204 of each IO blade 201 having congestion may provide a point-to-point PFC 227 to one or more of Ethernet switches 206, or all Ethernet switches 206. The point-to-point PFC 227 may backpressure a specific quality of service (QoS) class on a switch port so that the corresponding Ethernet switch 206 must stop transmitting packets for a specified time on the specified QoS class on the switch port that is being back pressured. Similarly, when one or more Ethernet switches 206 have congestion within the Ethernet switch 206 or within a processing core within the Ethernet switch 206, the Ethernet switch 206 may provide a point-to-point PFC 227 to one or more of IO blades 201-1 through 201-8 or all IO blades 201-1 through 201-8. The point-to-point PFC 227 may backpressure a specific quality of service (QoS) class on an Ethernet port so that the corresponding IO blade 201 must stop transmitting packets for a specified time on the specified QoS class on the Ethernet port that is being back pressured. In one or more other embodiments, the internal fabric layer may be built using IP layer with ECMP to establish the multi-path over fabric and use explicit congestion notification (ECN) and PFC to mimic VOQ, VIQ, and backpressure. WACC disaggregated networking switching system 200 may maintain an overall interconnect map and use link layer discovery protocol (LLDP) 229 in every internal link to provide connectivity verification.

Figure 3:
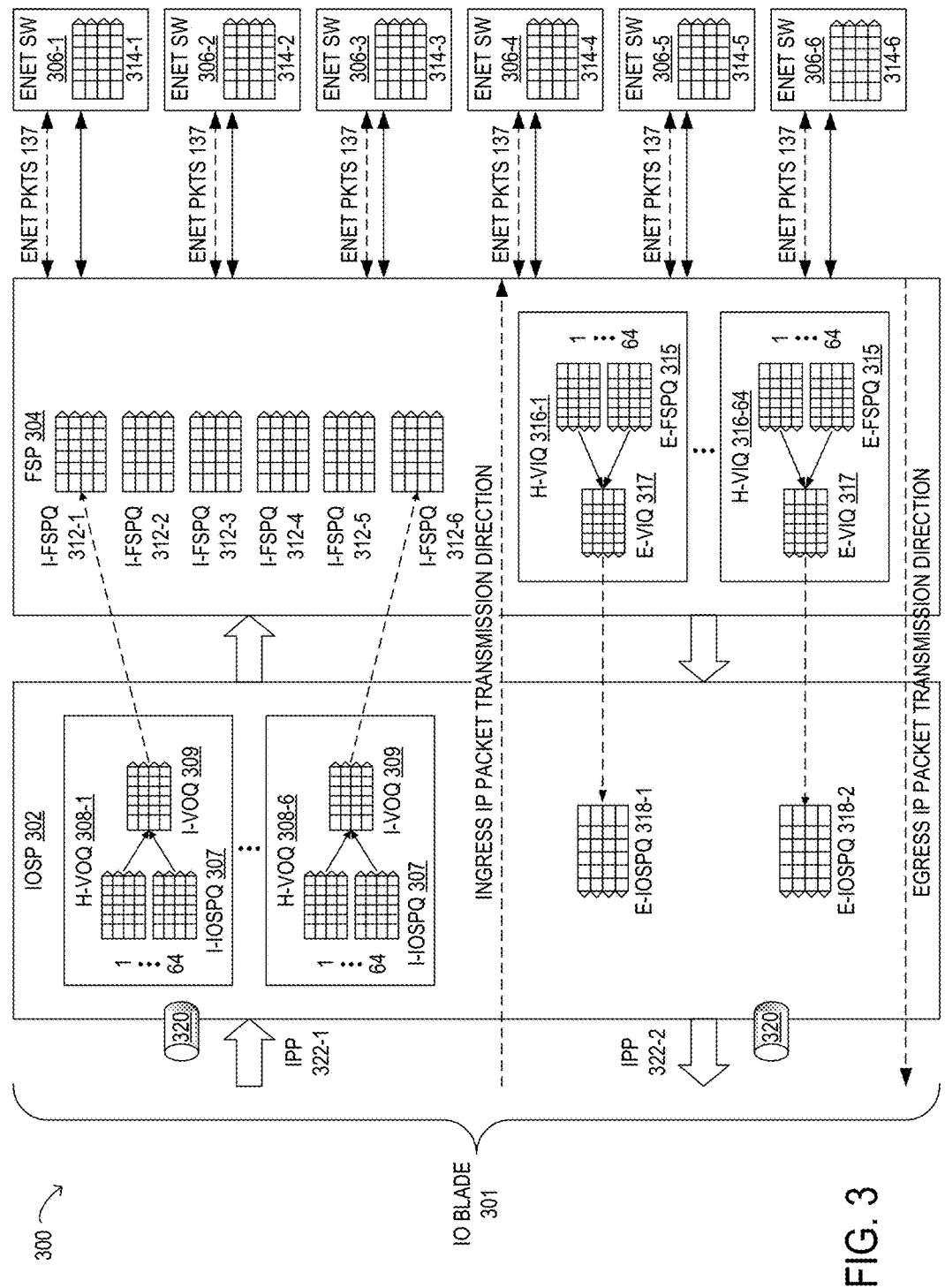
FIG. 3 is a block diagrams of a WACC disaggregated networking switching system.

Referring now to FIG. 3, a block diagram of selected elements of an embodiment of a WACC disaggregated networking switching system 300 is illustrated. Further details of an IO blade 201 including an IOSP 202 and a FSP 204, and Ethernet switches 206 previously described with reference to FIG. 2 are shown in WACC disaggregated networking switching system 300 of FIG. 3. Elements of WACC disaggregated networking switching system 300 may include, but are not limited to, an IO blade 301 including an IOSP 302 and a FSP 304, and a set of M Ethernet switches 306 including Ethernet switches 306-1, 306-2, 306-3, 306-4, 306-5, and 306-6.

Each Ethernet switch 306 may including a set of N switch ports (not shown). Ethernet switch 306-1 may establish switch queues 314-1, Ethernet switch 306-2 may establish switch queues 314-2, Ethernet switch 306-3 may establish switch queues 314-3, Ethernet switch 306-4 may establish switch queues 314-4, Ethernet switch 306-5 may establish switch queues 314-5, and Ethernet switch 306-6 may establish switch queues 314-6. A variable i may have a value ranging from 1 to M to denote the ith Ethernet switch 306 of the set of M Ethernet switches 306 and a variable j having a value ranging from 1 to N to denote the jth switch port of the set of N switch ports. The ith Ethernet port of IO device 301 may be connected to the jth switch port of the ith Ethernet switch 306.

IOSP 302 may include a set of W IO ports 320 and a set of M Ethernet ports (not shown). IOSP 302 may establish a set of M hierarchical virtual output queues (H-VOQs) 308 including H-VOQs 308-1, 308-2, 308-3, 308-4, 308-5, and 308-6. Each of H-VOQs 308-1, 308-2, 308-3, 308-4, 308-5, and 308-6 may include a set of N ingress-IOSP queues (I-IOSPQs) 307 including I-IOSPQs 307-1 through 307-64, and I-VOQs 309. The ith H-VOQ 308 may correspond to the ith Ethernet port of IOSP 302 and the ith I-IOSPQ 307 of the ith H-VOQ 308 may correspond to the jth IO blade (not shown). IOSP 302 may also establish a set of W egress-IOSP queues (E-IOSPQs) 318 including E-IOSPQs 318-1 and 318-2. A variable x may have a value ranging from 1 to W to denote the xth IO port 320 of the set of W IO ports 320. The xth E-IOSPQ 318 may correspond to the xth IO port 320 of IOSP 302.

FSP 304 may establish a set of M ingress-FSP queues (I-FSPQs) 312 including I-FSPQs 312-1, 312-2, 312-3, 312-4, 312-5, and 312-6. The ith I-FSPQ 312 may correspond to the ith Ethernet switch 306. FSP 304 may also establish a set of N hierarchical virtual input queues (H-VIQs) 316 including a set of N egress-FSP queues (E-FSPQs) 315 and E-VIQs 317. The jth H-VIQ 316 may correspond to jth IO device and the jth E-FSPQ 315 of the jth H-VIQ 316 may correspond to the jth IO device. As shown in FIG. 3, N has the value 64, M has the value 6, and W has the value 2.

Each I-IOSPQ 307 of each H-VOQ 308 of IOSP 302 is connected to each I-VOQ 309 of H-VOQ 308 of IOSP 302. Each I-VOQ 309 of each H-VOQ 308 of IOSP 302 is connected to a respective I-FSPQ 312 of FSP 304. Each I-FSPQ 312 of FSP 304 is connected to switch queues 314 of each respective Ethernet switch 306. Switch queues 314 of each Ethernet switch 306 is connected to FSP 304. Each E-FSPQ 315 of the set of N E-FSPQs 315 of each H-VIQ 316 of the set of N H-VIQs 316 of FSP 304 is connected to each E-VIQ 317 of each H-VIQ 316 of the set of N H-VIQs 316 of FSP 304 of FSP 304.

Switch queues 314 of each Ethernet switch 306 may comprise a set of P priority switch queues 314. A variable k may have a value ranging from 1 to P to denote the kth priority switch queue of switch queues 314. As shown in FIG. 3, P has a value of 4 as indicated by the 4 illustrated priority switch queues. In one or more embodiments, P may have a different value greater than or equal to 1. Each I-IOSPQ 307 of the set of N I-IOSPQs 307 of each H-VOQ 308 of the set M H-VOQs 308 of IOSP 302 of IO device 301 may comprise a set of P priority I-IOSPQs. The I-VOQs 309 of each H-VOQ 308 of the set M H-VOQs 308 of the IOSP 302 of IO device 301 may comprise a set of P priority I-VOQs. Each E-IOSPQ 315 of the set of W E-IOSPQs 315 of IOSP 302 of IO device 302 may comprise a set of P Priority E-IOSPQs. Each I-FSPQ 312 of the set of M I-FSPQs 312 of FSP 304 of IO device 301 may comprise a set of P priority I-FSPQs. Each E-FSPQ 315 of the set of N E-FSPQs 315 of each H-VIQs 316 of the set N H-VIQs 316 of FSP 304 of IO device 301 may comprise a set of P Priority E-FSPQs. Each E-VIQ 317 of each H-VIQ 316 of the set N H-VIQs 316 of FSP 304 of IO device 301 may comprise a set of P Priority E-VIQs.

During operation of WACC disaggregated networking switching system 300, IOSP 302 may receive an IP packet 322-1. IP packet 322-1 may be in an ingress IP packet transmission direction as indicated by the arrow from IOSP 302 to Ethernet switches 306. IOSP 302 may process IP packet 322-1 through H-VOQ 308-1. IOSP 302 may transmit IP packet 322-1 to FSP 304. When FSP 304 receives IP packet 322-1 from IOSP 302, FSP may generate an Ethernet packet 137-1 including packet data and a packet header of IP packet 322-1. FSP 304 may process Ethernet packet 137-1 through I-FSPQ 312-1 corresponding to H-VOQ 308-1. FSP 304 may transmit Ethernet packet 137-1 to an Ethernet switch 306 based on packet header information in Ethernet packet 137-1. When the Ethernet switch 306 receives Ethernet packet 137-1 from FSP 304, the Ethernet switch 306 may process Ethernet packet 137-1 through switch queues 314 of the Ethernet switch 306. The Ethernet switch 306 may generate an Ethernet packet 137-2 based on Ethernet packet 137-1 and an egress port number of an egress switch port of the set of N switch ports of the Ethernet switch 406 of Ethernet packet 437-1. The Ethernet switch 306 may transmit Ethernet packet 137-2 from the egress switch port of the Ethernet switch 306 to the egress IO device.

When FSP 304 of IO blade 301 receives an Ethernet packet 137 from the Ethernet switch 306, the FSP 304 of IO blade 301 may process the Ethernet packet 137 through H-VIQ 316-1. The Ethernet packet 137 may be in an egress IP packet transmission direction as indicated by the arrow from Ethernet switches 306 to FSP 304 of IO blade 301. FSP 304 of IO blade 301 may transmit the Ethernet packet 137 to IOSP 302 of IO blade 301. When IOSP 302 of IO blade 301 receives the Ethernet packet 137 from FSP 304 of IO blade 301, IOSP 302 of IO blade 301 may generate an IP packet 322-2 including packet data and a packet header of the Ethernet packet 137 based on the Ethernet packet 137. IOSP 304 of IO blade 301 may process IP packet 322-2 through E-IOSPQ 318-1 corresponding to H-VIQ 316-1. IOSP 304 of IO blade 301 may transmit IP packet 322-2 externally from an IO port 320 of IOSP 302 of IO blade 301.

An FSP 304 of an egress IO blade (not shown) may use hierarchical scheduling nodes, H-VIQs 316, to represent system VIQs and use QCN between VIQs and VOQs. For each port 320 or group of ports of the egress IO blade, there is a top-level scheduling node functioning as the ingress-blade-internal-fabric (E-BIF) VOQs for the IOSP 302 of the egress IO blade to avoid any head-of-line (HOL) blocking at IO ports 320. Under each top-level scheduling node, E-VIQ 316, there are N sets of queues each corresponding to an IOSP 302 of an ingress IO blade (not shown). N is equal to the number of IO blades. N is also equal to the number of Ethernet switch ports of each Ethernet switch 306. The N sets of queues are used as the system VIQs. QCN may be established between corresponding H-VOQs 308 and H-VIQs 316.

Figure 4A:
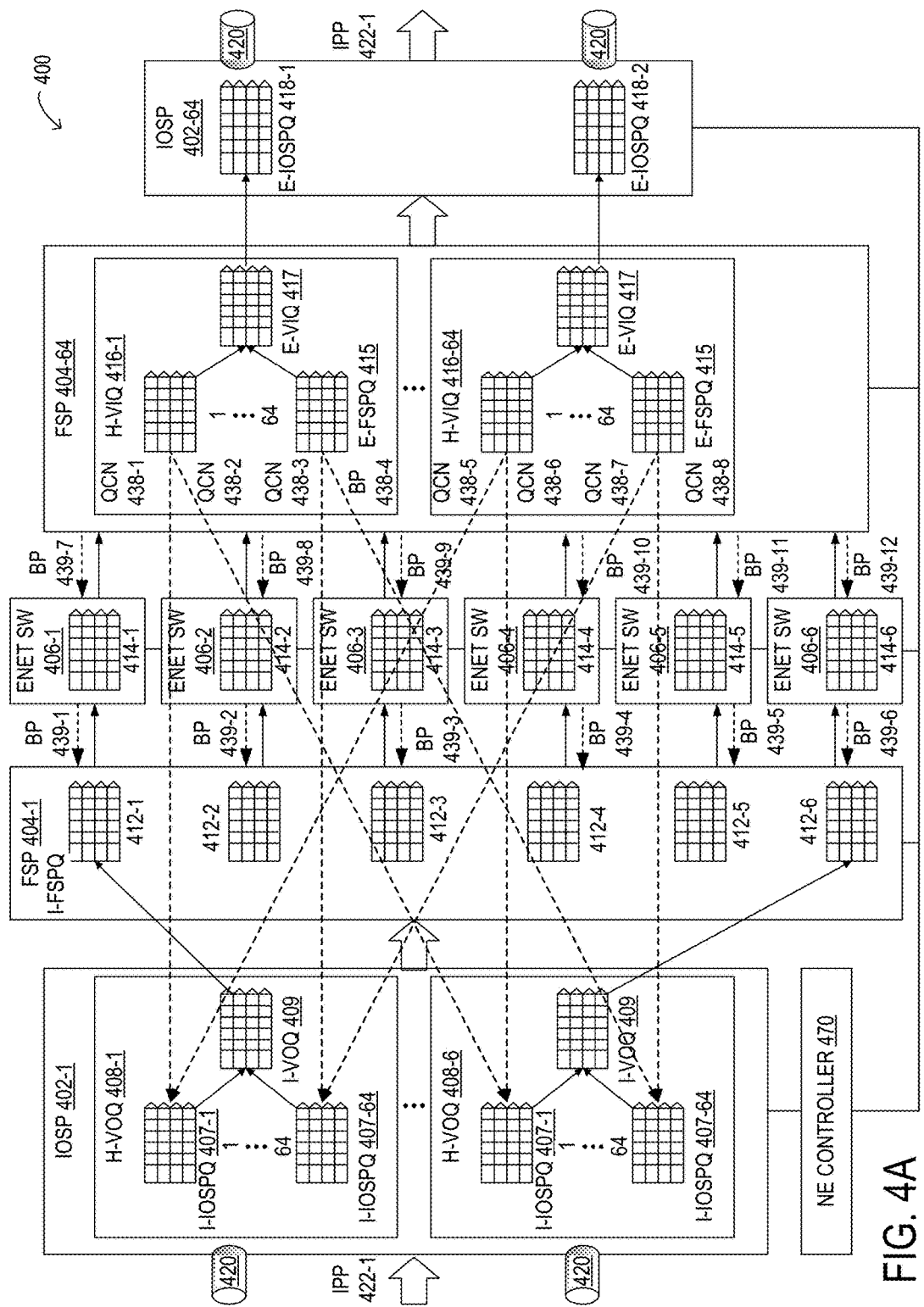

Turning now to FIGS. 4A, 4B, 4C, 4D, 4E, and 4F, a block diagram of IP packet transmission through an exemplary embodiment of a WACC disaggregated networking switching system 400 is illustrated. Referring now to FIG. 4A, further details of IOSP 302, FSP 304, and Ethernet switches 306 previously described with reference to FIG. 3 are shown in WACC disaggregated networking switching system 400 of FIG. 4A. Elements of WACC disaggregated networking switching system 400 may include, but are not limited to, a set of N IOSPs 402 including IOSPs 402-1 and 402-64, a set of N FSPs 404 including FSPs 404-1 and 404-64, a set of M Ethernet switches 406 including Ethernet switches 406-1, 406-2, 406-3, 406-4, 406-5, and 406-6, and network element (NE) controller 470. Each IOSP 402, each FSP 404, and each Ethernet switch 406, is structurally and functionally similar to IOSP 302, FSP 304, and each Ethernet switch 306, respectively, previously described with reference to FIG. 3. In FIG. 4A, WACC disaggregated networking switching system 400 is shown for ingress IP packet transmission direction from IOSP 402-1 to 402-64. Although WACC disaggregated networking switching system 400 is shown for ingress IP packet transmission direction from IOSP 402-1 to 402-64 and described below, it is understood that WACC disaggregated networking switching system 400 also supports egress IP packet transmission direction from ISOP 402-64 to IOSP 402-1, as previously described with reference to IOSP 302 and FSP 304 of FIG. 3.

In WACC disaggregated networking switching system 400, an IOSP 402-1 may establish quantize congestion notification (QCN) between each of I-IOSPQs 407-1 through 407-64 of each of H-VOQs 408-1 through 408-6 of the set of M H-VOQs 408 of IOSP 402-1 and each corresponding E-FSPQ 415 of the set of N E-FSPQs 415 of each H-VIQ 416 of the set of N H-VIQs 416 of FSP 404-64. Packet data in each I-IOSPQ 407 of the set of N I-IOSPQs 407 of each H-VOQ 408 of the set M H-VOQs 408 of IOSP 402-1 may be de-queued using a scheduling algorithm based on the established QCN. The scheduling algorithm may comprise a strict priority algorithm, a weighted fair queuing algorithm, a weighted round robin algorithm, a strict priority and weighted fair queuing algorithm, or a strict priority weighted round robin algorithm. In FIG. 4A, QCN is shown as dotted lines from each QCN 438 of each E-FSPQ 415 of the set of N E-FSPQs 415 of each respective H-VIQ 416 of the set of N H-VIQs 416 of FSP 404-64 to each respective I-IOSPQ 407 of the set of N I-IOSPQs 407 of each respective H-VOQ 408 of the set of M H-VOQs 408 of IOSP 402-1. As shown, QCN 438-1 from E-FSPQ 415-1 of H-VIQ 416-1 to I-IOSPQ 407-1 of H-VOQ 408-1, QCN 438-2 from E-FSPQ 415-1 of H-VIQ 416-1 to I-IOSPQ 407-1 of H-VOQ 408-6. QCN 438-3 from E-FSPQ 415-64 of H-VIQ 416-64 to I-IOSPQ 407-64 of H-VOQ 408-1. QCN 438-4 from E-FSPQ 415-64 of H-VIQ 416-1 to I-IOSPQ 407-64 of H-VOQ 408-6. QCN 438-5 from E-FSPQ 415-1 of H-VIQ 416-64 to I-IOSPQ 407-1 of H-VOQ 408-1, QCN 438-6 from E-FSPQ 415-1 of H-VIQ 416-64 to I-IOSPQ 407-1 of H-VOQ 408-6, QCN 438-7 from E-FSPQ 415-64 of H-VIQ 416-64 to I-IOSPQ 407-64 of H-VOQ 408-1, and QCN 438-8 from E-FSPQ 415-64 of H-VIQ 416-64 to I-IOSPQ 407-64 of H-VOQ 408-6.

In WACC disaggregated networking switching system 400, when an Ethernet switch 406 of the set of M Ethernet switches 406 has congestion within the Ethernet switch 406, within a processing core of the Ethernet switch 406, or within corresponding switch queues 414, the Ethernet switch 406 may provide point-to-point PFC 439 between switch queues 414 and each corresponding I-FSPQ 412 of the M I-FSPQs 412 of FSP 404-1. As shown, Ethernet switch 406-1 may provide point-to-point PFC 439-1 to I-FSPQ 412-1 of FSP 404-1, Ethernet switch 406-2 may provide point-to-point PFC 439-2 to I-FSPQ 412-2 of FSP 404-1, Ethernet switch 406-3 may provide point-to-point PFC 439-3 to I-FSPQ 412-3 of FSP 404-1, Ethernet switch 406-4 may provide point-to-point PFC 439-4 to I-FSPQ 412-4 of FSP 404-1, Ethernet switch 406-5 may provide point-to-point PFC 439-5 to I-FSPQ 412-5 of FSP 404-1, and Ethernet switch 406-6 may provide point-to-point PFC 439-6 to I-FSPQ 412-6 of FSP 404-1. The point-to-point PFC 439 may backpressure a specific quality of service (QoS) class on an Ethernet port (not shown) of a corresponding IO device (not shown) so that the corresponding IO device must stop transmitting packets for a specified time on the specified QoS class on the Ethernet port of the corresponding IO device that is being back pressured.

In the exemplary embodiment shown in FIG. 4A, six virtual Ethernet switches may be implemented in six physical Ethernet switches or three physical Ethernet switches each carrying two virtual Ethernet switches. Any one virtual Ethernet switch of the six virtual Ethernet switches may form a fabric plane. The switch queues on the central shared memory switch on each Ethernet switch may be port-based class queues that share a central on chip memory buffer. In a three physical Ethernet switch configuration, the two fabric planes that share the Ethernet switch will share that same buffer memory but will not interfere with each other.

In one or more embodiments, an ingress IO blade internal packet fabric may connect an IOSP 402 and an associated FSP 404 in the direction from IOSP 402 to FSP 404. An egress IO blade internal packet fabric may connect an FSP 404 and an associated IOSP 402 in the direction from FSP 404 to IOSP 402. The H-VOQs 408 queuing structure on an ingress IOSP 402 may perform the function of the VOQ structures as if it is a single monolithic switch/router. The I-FSPQs queuing structures on a FSP 404 are on a per egress port for ingress FSP 404 and a per class basis. Each lowest level E-VIQ 417 structure of an H-VIQ 416 on an egress FSP, represents the IP traffic from a specific ingress IO blade 401. The E-IOSPQs on an egress IOSP 402 provide per egress port and per class-based queuing.

Figure 4B:
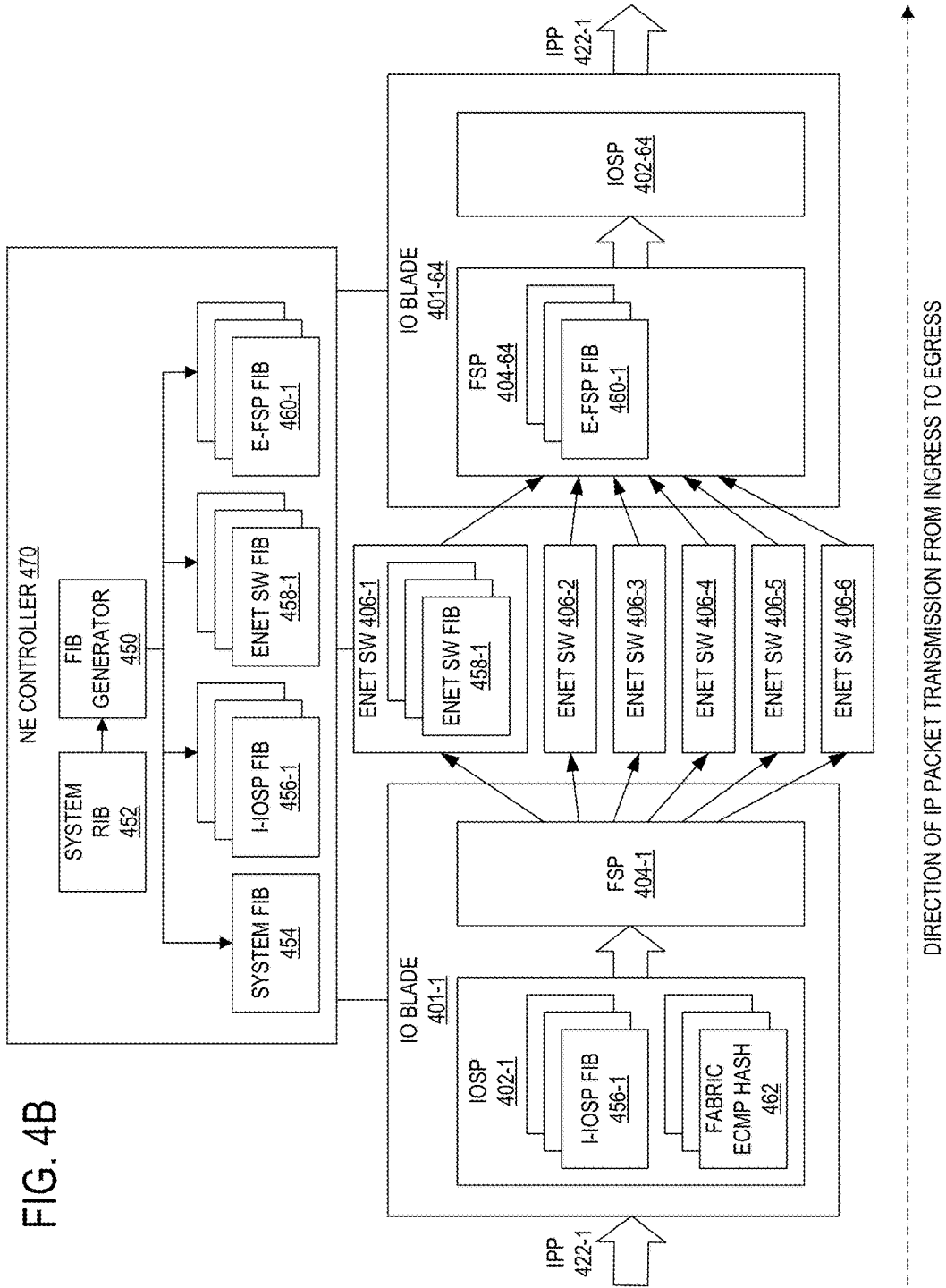

Referring now to FIG. 4B, a block diagram of selected elements of an embodiment of WACC disaggregated networking switching system 400 is illustrated. Elements of WACC disaggregated networking switching system 400 may also include, but are not limited to, ingress IO blade 401-1, Ethernet switches 406 including Ethernet switches 406-1, 406-2, 406-3, 406-4, 406-5, and 406-6, egress IO blade 401-64, and NE controller 470.

NE controller 470 may include system routing information base (RIB) 452, forwarding information base (FIB) generator 450, system FIB 454, I-IOSP FIB 456-1, Ethernet switch FIB 458-1, and E-FSP FIB 460-64. NE controller 470 may generate system RIB 452 for WACC disaggregated networking switching system 400 when NE controller 470 runs IP routing protocols. In one or more other embodiments, system RIB 452 may be generated and pushed down from a higher-level entity such as a software defined network (SDN), a cloud-based control plane, or another type of higher-level entity. NE controller 470 utilizes FIB generator 450 to generate its own system-wide FIB, system FIB 454 and a component FIB for each major forwarding component. As shown, NE controller 470 generates a I-IOSP FIB 456 for each IOSP 402 of each ingress IO blade 401 including I-IOSP FIB 456-1 for IOSP 402-1 of ingress IO blade 401-1. NE controller 470 also generates an Ethernet switch FIB 458 for each Ethernet switch 406 including Ethernet switch FIB 458-1 for Ethernet switch 406-1. NE controller 470 further generates an E-FSP FIB 460 for each FSP 404 of each egress IO blade 401 including E-FSP FIB 460-64 for FSP 404-64 of egress IO blade 401-64. NE controller 470 may push down IOSP FIB 456-1 to IOSP 402-1 of ingress IO blade 401-1, Ethernet switch FIB 458-1 to Ethernet switch 406-1, and E-FSP FIB 460-1 for FSP 404-64 of egress IO blade 401-64. For the encapsulation of external NE level IP packets, multi-protocol label switching (MPLS) labels may be utilized. The hierarchical system VOQ structure may allow for full utilization of multi-path.

Ingress IOSP 401-1 may use classical 5 Tuple look-up to provide micro-flows within each pair of ingress and egress ports 420, and each microflow will take a specific path through the internal fabric layer via a hashing function. This will maintain the order of the packet sequence within a micro-flow and this order will be preserved through the multipath bridging domain. If one of the fabric planes fails such as Ethernet switch 406-2, the microflows that hashed over that failed plane will be re-hashed to be distributed over all the remaining planes, Ethernet switches 406-1, 406-3, 406-4, 406-5, and 406-6.

Figure 4C:
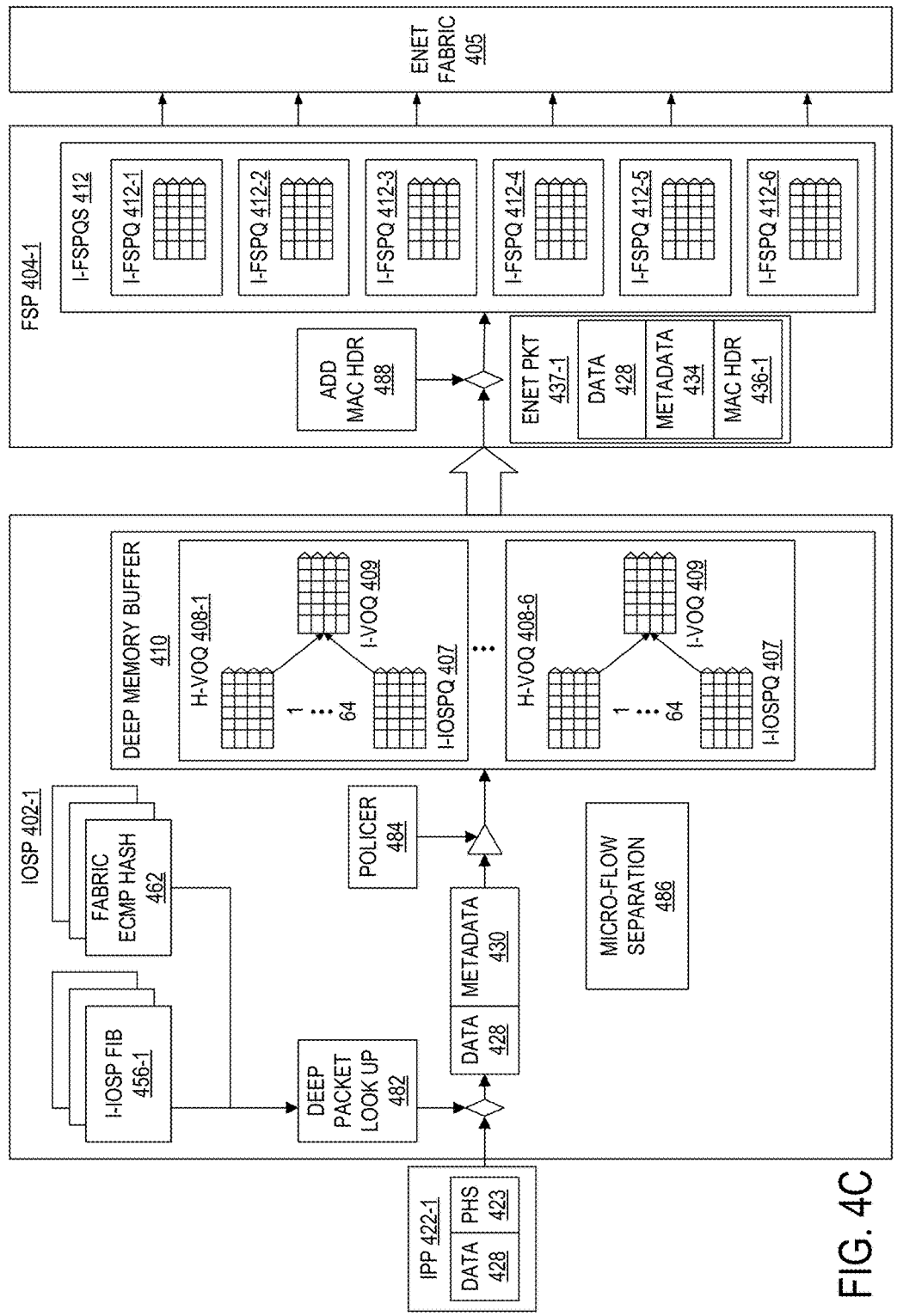

Referring now to FIG. 4C, a block diagram of selected elements of an embodiment of WACC disaggregated networking switching system 400 is illustrated. Elements of WACC disaggregated networking switching system 400 may include, but are not limited to, IOSP 402-1, FSP 404-1, and Ethernet fabric 405. IOSP 402-1 may include I-IOSP FIB 456-1, fabric ECMP HASH 462, a deep packet look-up algorithm 482, a policer 484, a microflow separation algorithm 486, and a deep memory buffer 410 including H-VOQ 408-1 to H-VOQ 408-6. FSP 404-1 may include an add media access controller (MAC) header algorithm 488 and I-FPQs 412.

During operation, IOSP 402-1 may receive an IP packet 422-1 including packet headers (PHS) 423 and packet data 428. IOSP 402-1 may utilize deep packet look-up algorithm 482 to determine an egress IO device of the set of N IO devices and an egress port number of the egress IO device based on packet header information of PHS 423 of IP packet 422-1. IOSP 402-1 may classify IP packet 422-1 to a flow and a traffic class based on the packet header information, the egress IO device, and the egress port number. IOSP 402-1 may generate an ECMP forwarding HASH key from a 5-Tuple of the packet header information using a hashing algorithm. IOSP 402-1 may utilize micro-flow separation algorithm 486 to identify a micro-flow for the ECMP hash key in fabric ECMP HASH 462 based on I-IOSP FIB 456-1. IOSP 402-1 may generate a switch number of a corresponding Ethernet switch 406 based on the micro-flow, queue packet data 428 of the packet and metadata 430 to an I-IOSPQ 407 of an H-VOQ 408 corresponding respectively to the egress IO device and the switch number. Metadata 430 may comprise PHS 423, an internal traffic class 490, an internal flow identification (ID) 492 corresponding to the flow, the egress port number 494, an egress IO blade ID 496 corresponding to the egress IO device, and the ECMP/Ethernet switch number 498 as shown in FIG. 4F. IOSP 402-1 may de-queue packet data 428 and metadata 430 from the respective I-VOQ 409 of the respective H-VOQ 408 using a scheduling algorithm and transmit the de-queued packet data 428 and metadata 430 to FSP 404-1. FSP 404-1 may generate an Ethernet packet 437-1 including packet data 428, metadata 434, and a media access control (MAC) header 436-1. FSP 404-1 may queue Ethernet packet 437-1 to an I-FSPQ 412 corresponding to the switch number 498 of metadata 434 of Ethernet packet 437-1, and de-queue Ethernet packet 437-1 from the I-FSPQ 412 using the scheduling algorithm. FSP 404-1 may also transmit the de-queued Ethernet packet 437-1 to the egress IO device via an Ethernet switch 406 corresponding to the switch number 498. Metadata 434 may comprise PHS 423, internal traffic class 490, internal flow ID 492 corresponding to the flow, egress port number 494, and egress IO blade ID 496 corresponding to the egress IO device, as shown in FIG. 4F.

Figure 4D:
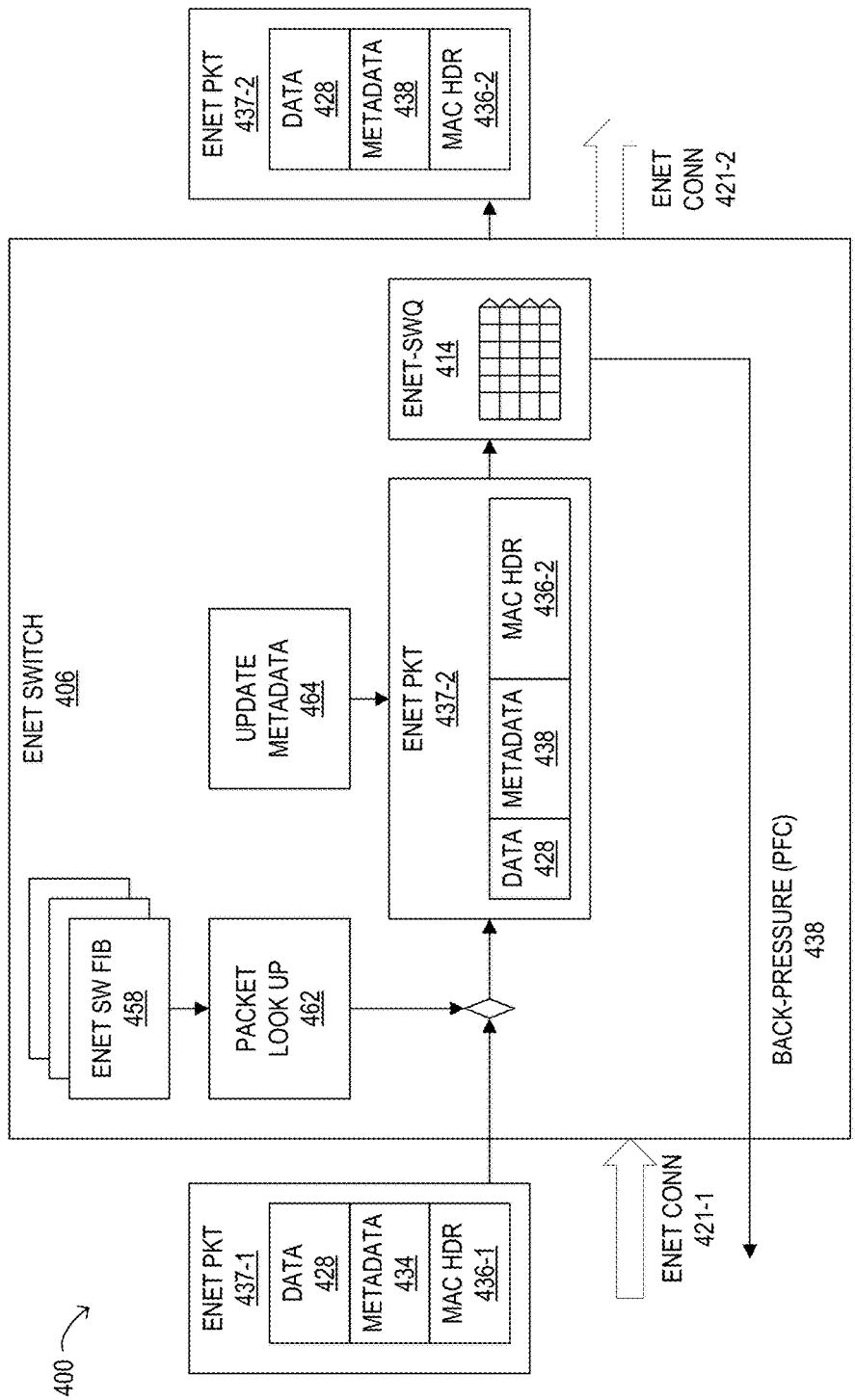

Referring now to FIG. 4D, a block diagram of selected elements of an embodiment of WACC disaggregated networking switching system 400 is illustrated. Elements of WACC disaggregated networking switching system 400 may also include, but are not limited to, Ethernet switch 406, Ethernet connection 421-1 connecting FSP 404-1 to Ethernet switch 406, and Ethernet connection 421-2 connecting Ethernet switch 406 to FSP 404-64. Ethernet switch 406 may include Ethernet switch FIB 458 and Ethernet switch queues 414.

During operation, Ethernet switch 406 may receive Ethernet packet 437-1 including packet data 428, metadata 434, and MAC header 436-1 from FSP 404-1. Ethernet switch 406 may utilize packet look-up algorithm 462 to identify an egress port of the set of N switch ports of Ethernet switch 406 based on egress port number 494 of metadata 434, metadata 434, and MAC header 436-1 of Ethernet packet 437-1. Ethernet switch 406 may generate a MAC header 436-2 based on egress port number 494 and egress IO blade 496 of metadata 434. Ethernet switch 406 may utilize an update metadata algorithm 464 to generate metadata 438 from metadata 434 by removing the egress IO blade 496 from metadata 434. Ethernet switch 406 may generate Ethernet packet 437-2 including packet data 428, metadata 438, and MAC header 436-2. Ethernet switch 406 may queue Ethernet packet 437-2 to switch queues 414 of the Ethernet switch 406. Ethernet switch may de-queue Ethernet packet 437-2 from switch queues 414 using a scheduling algorithm. Ethernet switch 406 may transmit the de-queued Ethernet packet 437-2 to FSP 404-64 via the egress port of the Ethernet switch 406. Ethernet switch 406 may send PFC 438 to IOSP 402-1 if performance has degraded. Metadata 438 may comprise PHS 423, internal traffic class 490, internal flow ID 492 corresponding to the flow, and egress port number 494, as shown in FIG. 4F.

Figure 4E:
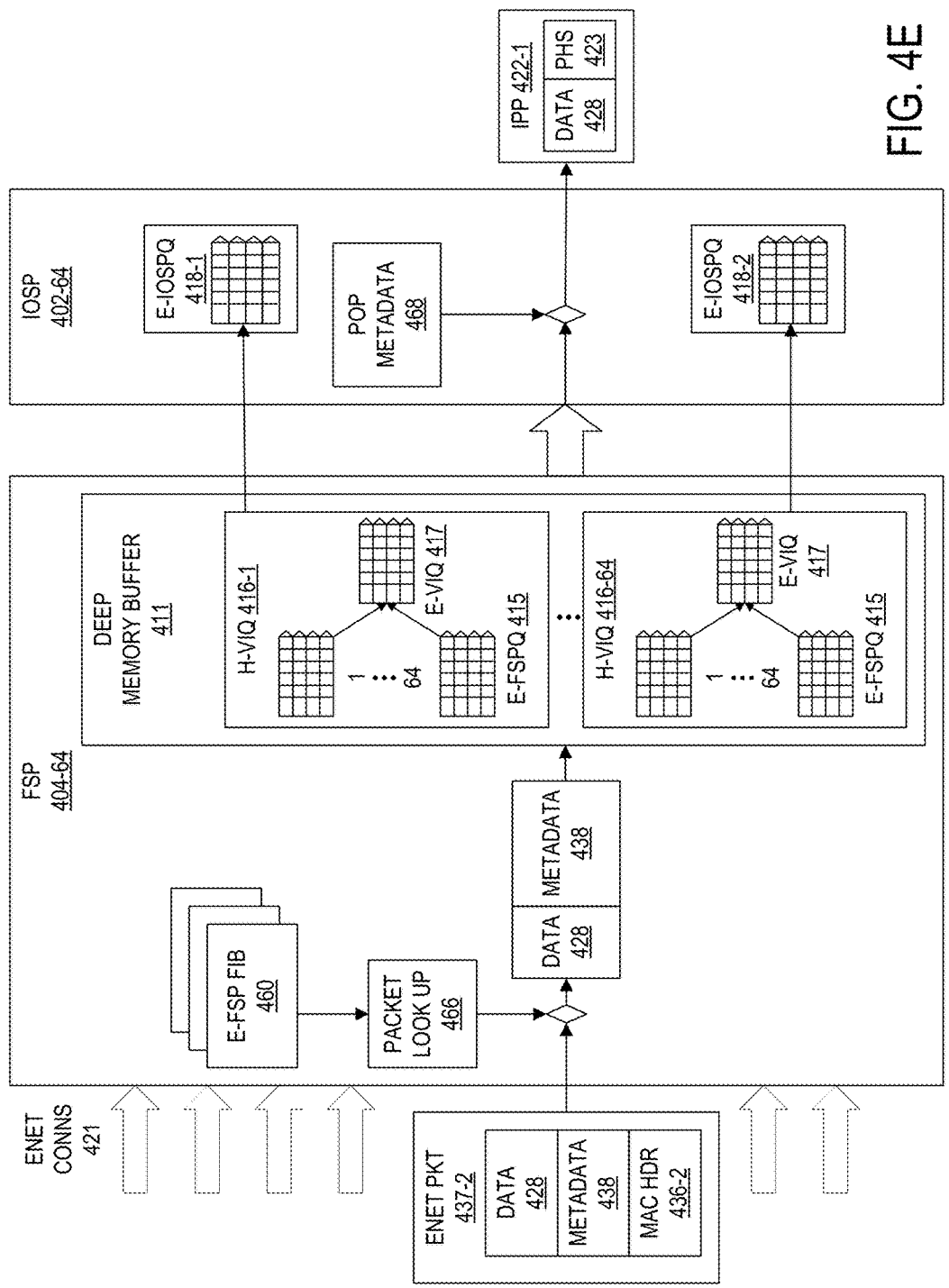

Referring now to FIG. 4E, a block diagram of selected elements of an embodiment of WACC disaggregated networking switching system 400 is illustrated. Elements of WACC disaggregated networking switching system 400 may also include, but are not limited to, Ethernet connections 421 connecting Ethernet switch 406 to FSP 404-64, FSP 404-64, and IOSP 402-64. FSP 404-64 may include E-FSB FIB 460 and deep memory buffer 411 comprising H-VIQs 416-1 through 416-64.

During operation, FSP 404-64 may receive Ethernet packet 437-2 including packet data 428, metadata 438, and MAC header 436-2 at an Ethernet port of the egress IO blade 401-64. FSP 404-64 may utilize packet look-up algorithm 466 to determine an ingress IO blade 401 of the set of N IO blades 406 based on E-FSP FIB 460 and internal flow ID 492 of metadata 438. FSP 404-64 may queue packet data 428 and metadata 438 of Ethernet packet 437-2 to an E-FSPQ 415 of the set of N E-FSPQs 415 of an H-VIQ 416 of the set of N H-VIQs 416 corresponding respectively to the ingress IO blade 401 and IO port 420 of egress IO blade 401. FSP 404-64 may de-queue packet data 428 and metadata 438 from the E-VIQ 417 of the set of N E-FSPQs 415 of the H-VIQ 416 of the set of N H-VIQs 416 using a scheduling algorithm. FSP 404-64 may transmit the de-queued packet data 428 and metadata 438 to IOSP 402-64. IOSP 402-64 may utilize a pop metadata algorithm 468 to remove metadata 438 and to re-create IP packet 422-1 including PHS 423 of metadata 438 and packet data 428. IOSP 402-64 may queue IP packet 422-1 to an E-IOSPQ 418 corresponding to the egress port 494 of the egress IO blade 496 of metadata 438. IOSP 402-64 may de-queue IP packet 422-1 from the E-IOSPQ 418 using the scheduling algorithm. IOSP 402-64 may transmit IP packet 422-1 via the egress port 494. The queuing of IP packet 422-1 into the appropriate H-VIQ 416 is based on internal flow ID 492 of metadata 438, which also identifies which IO blade 401 IP packet 422-1 came from.

Referring now to FIG. 5, a block diagram of selected elements of an embodiment of WACC disaggregated networking switching system 500 including virtual slots is illustrated. Elements of WACC disaggregated networking switching system 500 may also include, but are not limited to, IO blades 501 including IO blades 501-1, 501-2, 501-3, 501-62, 501-63, and 501-64 and Ethernet switches 506 including Ethernet switches 506-1, 506-2, 506-3, 506-4, 506-5, and 506-6. Each IO blade 501 includes an IOSP 502 and an FSP 504. IO blade 501-1 includes IOSP 502-1 and FSP 504-1, IO blade 501-2 includes IOSP 502-2 and FSP 504-2, IO blade 501-3 includes IOSP 502-3 and FSP 504-3, IO blade 501-4 includes IOSP 502-4 and FSP 504-4, IO blade 501-5 includes IOSP 502-5 and FSP 504-5, and IO blade 501-6 includes IOSP 502-6 and FSP 504-6. Each Ethernet switch 506 may include switch port S1 through switch port S64. Ethernet switches 506 may also include a virtual switch fabric including a set of N virtual line card slots 509. Each virtual line card slot 409 comprises a logical aggregation of the jth switch port of the set of N switch ports of each of the set of M Ethernet switches 406, where the jth IO blade 501 of the set of N IO blades 501 associated with only the jth virtual line card slot 509 of the N virtual line card slots 509. As shown in FIG. 5, all 6 Ethernet switches 506, fabric planes, have their switch ports aligned in such a way that the same numbered switch ports across all Ethernet switches 406, fabric planes, form a virtual line card slot 509. Thus, each switch port on the fabric is uniquely identified by it Ethernet switch number/fabric plane number and slot number. As shown, virtual line card slot 509-1 includes slot 1 of each Ethernet switch 506, fabric plane, virtual line card slot 509-2 includes slot 2 of each Ethernet switch 506, virtual line card slot 509-3 includes slot 3 of each Ethernet switch 506, virtual line card slot 509-62 includes slot 62 of each Ethernet switch 506, virtual line card slot 509-63 includes slot 63 of each Ethernet switch 506, and virtual line card slot 509-64 includes slot 64 of each Ethernet switch 506. Each IO blade 501 is connect to one and only one virtual slot 509. As shown, IO blade 501-1 is connected to virtual line card slot 509-1 and IO blade 501-64 is connected to virtual line card slot 509-64. It will be understood that each IO blade 501 will connect to a respective virtual line card slot 509. As such, an IO blade's positioning in the fabric is identified by the virtual line card slot number, i.e. the IO blade 501 in the first virtual line card slot 509-1 is identified as IO blade 501 number 1 and the last virtual line card slot number 509-64 is identified as IO blade 501 number 64. In should be understood that not all virtual line card slots 509 has to be populated. LLDP is enabled on all interconnect links so that any mis-connection can be quickly detected.

Referring now to FIG. 6, a block diagram of selected elements of another embodiment of a WACC disaggregated networking switching system 600 is illustrated. Elements of WACC disaggregated networking switching system 600 may include, but are not limited to, a set of N IOSPs 602 including IOSPs 602-1 and 602-64, a set of N FSPs 604 including FSPs 604-1 and 604-64, and a set of M Ethernet switches 606 including Ethernet switches 606-1, 606-2, 606-3, 606-4, 606-5, and 606-6. In FIG. 6, IOSPs 602-1 and 602-64, FSPs 604-1 and 604-64, and the set of M Ethernet switches 606 including Ethernet switches 606-1, 606-2, 606-3, 606-4, 606-5, and 606-6, are shown for IP packet transmission direction from ingress IOSP 602-1 to egress 602-64. Although IOSPs 602-1 and 602-64, FSPs 604-1 and 604-64, and the set of M Ethernet switches 606 including Ethernet switches 606-1, 606-2, 606-3, 606-4, 606-5, and 606-6 are shown for IP packet transmission direction from ingress IOSP 602-1 to egress 602-64, and described below, it is understood that IOSP 602-1 would also include the elements of IOSP 602-64, IOSP 602-64 would also include the elements of IOSP 602-1, FSP 604-1 would also include the elements of FSP 604-64, and FSP 604-64 would also include the elements of FSP 604-1 for IP packet transmission direction from ingress ISOP 602-64 to egress IOSP 602-1.

Each Ethernet switch 606 may including a set of N switch ports (not shown). Ethernet switch 604-1 may establish switch queues 614-1, Ethernet switch 604-2 may establish switch queues 614-2, Ethernet switch 604-3 may establish switch queues 614-3, Ethernet switch 604-4 may establish switch queues 614-4, Ethernet switch 604-5 may establish switch queues 614-5, and Ethernet switch 604-6 may establish switch queues 614-6. The ith Ethernet port of the jth IO blade may be connected to the jth switch port of the ith Ethernet switch 606.

Each IOSP 602 may include a set of W IO ports 620 and a set of M Ethernet ports (not shown). Each IOSP 602 may establish a set of M H-VOQs 608 each including a set of N I-IOSPQs 607 and I-VOQs 609. Each IOSP 602 may also establish a set of W E-IOSPQs 618. The ith H-VOQ 608 may correspond to the ith Ethernet port of the jth IOSP 602 and the ith I-IOSPQ 607 of the set of N I-IOSPQs 607 of the ith H-VOQ 608 of the set of M H-VOQs 608 may correspond to the jth IO blade (not shown). The xth E-IOSPQ 618 may correspond to the xth IO port 620 of each IOSP 602. IOSP 602-1 may establish H-VOQ 608-1 through H-VOQ 608-6 each including N I-IOSPQs 607 and I-VOQ 609.

Each FSP 604 may establish a set of M I-FSPQs 612. The ith I-FSPQ 612 may correspond to the ith Ethernet switch 606. FSP 604-1 may establish a set of M I-FSPQs 612-1, I-FSPQs 612-2, I-FSPQs 612-3, I-FSPQs 612-4, I-FSPQs 612-5, and I-FSPQs 612-6. Each FSP 604 may also establish a set of N E-VIQs 616. FSP 604-64 may establish E-VIQ 616-1 through VIQ 616-64 of the set of N E-VIQs 616. As shown in FIG. 6, N has the value 64, M has the value 6, and W has the value 2.

During operation of WACC disaggregated networking switching system 600, IOSP 602-1 may receive IP packet 622. IOSP 602-1 may process IP packet 622 through H-VOQ 608-1 of the set of M H-VOQs 608 and transmit IP packet 622 to FSP 604-1. FSP 604-1 may transmit IP packet 622 to an Ethernet switch 606 based on a forwarding information base of IOSP 602-1 and packet header information in IP packet 622. The Ethernet switch 606 may process IP packet 622 through switch queues 614 of the Ethernet switch 606 and transmit IP packet 622 to FSP 604-64 based on a forwarding information base of Ethernet switch 606 and packet header information of IP packet 622. FSP 604-64 may process IP packet 622 through E-VIQ 616-1 of the set of N E-VIQs 616 and may transmit IP packet 622 to IOSP 602-64. IOSP 602-64 may process IP packet 622 through E-IOSPQ 618-1 and transmit IP packet 622 externally from IO port 620 of IOSP 602-64.

In WACC disaggregated networking switching system 600, IOSP 602-1 of IO device 601-1 may establish QCN between each I-IOSPQ 607 of the set of N I-IOSPQs 607 of each H-VOQ 608 of the set of M H-VOQs 608 of IOSP 602-1 of IO device 601-1 and each corresponding E-VIQ 616 of the set of N E-VIQs 616 of FSP 604-64 of IO device 601-64. Packet data in each I-IOSPQ 607 of the set of N I-IOSPQs 607 of each H-VOQ 608 of the set M H-VOQs 608 of IOSP 602-1 may de-queued using a scheduling algorithm based on the established QCN. In FIG. 6, QCN is shown as dotted lines from each QCN 638 of each E-VIQ 616 of the set of N E-VIQs 616 of FSP 604-64 of IO device 601-64 to each respective I-IOSPQ 607 of the set of N I-IOSPQs 607 of each H-VOQ 608 of the set of M H-VOQs 608 of IOSP 602-1 of IO device 601-1. As shown, QCN 638-1 from E-VIQ 616-1 of the set of N E-VIQs 616 to I-IOSPQ 607-1 of the set of N I-IOSPQs 607 of H-VOQ 608-1 of the set of M H-VOQs 608. QCN 638-2 from E-VIQ 616-1 of the set of N E-VIQs 616 to I-IOSPQ 607-1 of the set of N I-IOSPQs 607 of H-VOQ 608-6 of the set of M H-VOQs 608. QCN 638-3 from E-VIQ 616-64 of the set of N E-VIQs 616 to I-IOSPQ 607-64 of the set of N I-IOSPQs 607 of H-VOQ 608-1 of the set of M H-VOQs 608. QCN 638-4 from E-VIQ 616-64 of the set of N E-VIQs 616 to I-IOSPQ 607-64 of the set of N I-IOSPQs 607 of H-VOQ 608-6 of the set of M H-VOQs 608.

In WACC disaggregated networking switching system 600, when an Ethernet switch 606 of the set of M Ethernet switches 606 has congestion within the Ethernet switch 606, within a processing core of the Ethernet switch 606, or within a corresponding switch queues 614, the Ethernet switch 606 may provide point-to-point PFC 639 between switch queues 614 and each corresponding I-FSPQ 612 of the M I-FSPQs 612 of the FSP 604 of each IO device 601 of the set of N IO devices 601. As shown, Ethernet switch 606-1 may provide point-to-point PFC 639-1 to I-FSPQ 612-1 of FSP 604-1, Ethernet switch 606-2 may provide point-to-point PFC 639-2 to I-FSPQ 612-2 of FSP 604-1, Ethernet switch 606-3 may provide point-to-point PFC 639-3 to I-FSPQ 612-3 of FSP 604-1, Ethernet switch 606-4 may provide point-to-point PFC 639-4 to I-FSPQ 612-4 of FSP 604-1, Ethernet switch 606-5 may provide point-to-point PFC 639-5 to I-FSPQ 612-5 of FSP 604-1, and Ethernet switch 606-6 may provide point-to-point PFC 639-6 to I-FSPQ 612-6 of FSP 604-1. The point-to-point PFC 639 may backpressure a specific quality of service (QoS) class on an Ethernet port 621 of a corresponding IO device 601 so that the corresponding IO device 601 must stop transmitting packets for a specified time on the specified QoS class on the Ethernet port 621 that is being back pressured.

WACC disaggregated networking switching system 600 may utilize a flat set of E-VIQs 616 to represent a system VIQ and may use QCN between E-VIQs 616 and I-VOQs 609. Each set of E-VIQs 616 may represent one ingress IO blade 601. As such, the number of IO blades 601 equals the number of Ethernet switch ports set of switch queues. Since there are no scheduling nodes H-VIQs in an FSP 604 to represent the egress ports, head-of-line (HOL) blocking might occur. However, the chance that every VIQ 616 of the set of N VIQs 616 are blocked on a single egress port is very small.

Turning now to FIG. 7, is a block diagram of yet another WACC disaggregated networking switching system 700. Referring now to FIG. 7, a block diagram of selected elements of yet another embodiment of a WACC disaggregated networking switching system 700 is illustrated. Elements of WACC disaggregated networking switching system 700 may include, but are not limited to, a set of N IOSPs 702 including IOSPs 702-1 and 702-64, a set of N FSPs 704 including FSPs 704-1 and 704-64, and a set of M Ethernet switches 706 including Ethernet switches 706-1, 706-2, 706-3, 706-4, 706-5, and 706-6. In FIG. 7, IOSPs 702-1 and 702-64, FSPs 704-1 and 704-64, and the set of M Ethernet switches 706 including Ethernet switches 706-1, 706-2, 706-3, 706-4, 706-5, and 706-6, are shown for IP packet transmission direction from ingress IOSP 702-1 to egress 702-64. Although IOSPs 702-1 and 702-64, FSPs 704-1 and 704-64, and the set of M Ethernet switches 706 including Ethernet switches 706-1, 706-2, 706-3, 706-4, 706-5, and 706-6 are shown for IP packet transmission direction from ingress IOSP 702-1 to egress 702-64, and described below, it is understood that IOSP 702-1 would also include the elements of IOSP 702-64, IOSP 702-64 would also include the elements of IOSP 702-1, FSP 704-1 would also include the elements of FSP 704-64, and FSP 704-64 would also include the elements of FSP 704-1 for IP packet transmission direction from ingress ISOP 702-64 to egress IOSP 702-1.

Each Ethernet switch 706 may including a set of N switch ports (not shown). Ethernet switch 704-1 may establish switch queues 714-1, Ethernet switch 704-2 may establish switch queues 714-2, Ethernet switch 704-3 may establish switch queues 714-3, Ethernet switch 704-4 may establish switch queues 714-4, Ethernet switch 704-5 may establish switch queues 714-5, and Ethernet switch 704-6 may establish switch queues 714-6. The ith Ethernet port of the jth IO blade may be connected to the jth switch port of the ith Ethernet switch 706.

Each IOSP 702 may include a set of W IO ports 720 and a set of M Ethernet ports (not shown). Each IOSP 702 may establish a set of M H-VOQs 708 each including a set of N I-IOSPQs 707 and I-VOQs 709. Each IOSP 702 may also establish a set of W E-IOSPQs 718. The ith H-VOQ 708 may correspond to the ith Ethernet port of the jth IOSP 702 and the ith I-IOSPQ 707 of the set of N I-IOSPQs 707 of the ith H-VOQ 708 of the set of M H-VOQs 708 may correspond to the jth IO blade (not shown). The xth E-IOSPQ 718 may correspond to the xth IO port 720 of each IOSP 702. IOSP 702-1 may establish H-VOQ 708-1 through H-VOQ 708-6 each including N I-IOSPQs 707 and I-VOQ 709.

Each FSP 704 may establish a set of M I-FSPQs 712. The ith I-FSPQ 712 may correspond to the ith Ethernet switch 706. FSP 704-1 may establish a set of W I-FSPQs 712-1, I-FSPQs 712-2, I-FSPQs 712-3, I-FSPQs 712-4, I-FSPQs 712-5, and I-FSPQs 712-6. Each FSP 704 may also establish W E-VIQs 716 including E-VIQs 716-1 and 716-64. As shown in FIG. 7, N has the value 64, M has the value 6, and W has the value 2. Each E-VIQ 716 of associated FSP 704-64 is connected to a respective E-IOSPQ 718 of each IOSP 702.

During operation of WACC disaggregated networking switching system 700, IOSP 702-1 may receive IP packet 722. IOSP 702-1 may process IP packet 722 through H-VOQ 708-1 of the set of N H-VOQs 708 and transmit IP packet 722 to FSP 704-1. FSP 704-1 may transmit IP packet 722 to an Ethernet switch 706 based on a forwarding information base of IOSP 702-1 and packet header information in IP packet 722. The Ethernet switch 706 may process IP packet 722 through switch queues 714 of the Ethernet switch 706 and transmit IP packet 722 to FSP 704-64 based on a forwarding information base of Ethernet switch 706 and packet header information of IP packet 722. FSP 704-64 may process IP packet 722 through E-VIQ 716-1 of the set of W E-VIQs 716 and may transmit IP packet 722 to IOSP 702-64. IOSP 702-64 may process IP packet 722 through E-IOSPQ 718-1 and transmit IP packet 722 externally from IO port 720 of IOSP 702-64. The point-to-point PFC 739 may backpressure a specific quality of service (QoS) class on a switch port 723 of a corresponding Ethernet switch 706 so that the corresponding Ethernet switch 706 must stop transmitting packets for a specified time on the specified QoS class on the switch port 723 that is being back pressured.

In WACC disaggregated networking switching system 700, when a FSP 704 of an IO device 701 of the N IO devices 701 has congestion within an IO device 701, within a processing core of the IO device 701, or within a corresponding E-VIQ 716 of the FSP 704 of the IO device 701, the FSP 704 may provide point-to-point PFC 739 between each Ethernet port 721 of the IO device 704 and each switch port 723 of each corresponding Ethernet switch 706 of the M Ethernet switches 706. As shown, FSP 704-64 may provide point-to-point PFC 739-7 to switch port 723 of Ethernet switch 706-1, FSP 704-64 may provide point-to-point PFC 739-8 to switch port 723 of Ethernet switch 706-2, FSP 704-64 may provide point-to-point PFC 739-9 to switch port 723 of Ethernet switch 706-3, FSP 704-64 may provide point-to-point PFC 739-10 to switch port 723 of Ethernet switch 706-4, FSP 704-64 may provide point-to-point PFC 739-11 to switch port 723 of Ethernet switch 706-5, and FSP 704-64 may provide point-to-point PFC 739-12 to switch port 723 of Ethernet switch 706-6. When an Ethernet switch 706 of the set of M Ethernet switches 706 has congestion within the Ethernet switch 706, within a processing core of the Ethernet switch 706, or within a corresponding switch queue 714, the Ethernet switch 706 may provide point-to-point PFC 739 between a switch queue 714 of the Ethernet switch 706 and each corresponding I-FSPQ 712 of the M I-FSPQs 712 of the FSP 704 of each IO device 701 of the set of N IO devices 701. As shown, Ethernet switch 706-1 may provide point-to-point PFC 739-1 to I-FSPQ 712-1 of FSP 704-1, Ethernet switch 706-2 may provide point-to-point PFC 739-2 to I-FSPQ 712-2 of FSP 704-1, Ethernet switch 706-3 may provide point-to-point PFC 739-3 to I-FSPQ 712-3 of FSP 704-1, Ethernet switch 706-4 provide point-to-point PFC 739-4 to I-FSPQ 712-4 of FSP 704-1, Ethernet switch 706-5 provide point-to-point PFC 739-5 to I-FSPQ 712-5 of FSP 704-1, and Ethernet switch 706-6 provide point-to-point PFC 739-6 to I-FSPQ 712-6 of FSP 704-1. The point-to-point PFC 739 may backpressure a specific quality of service (QoS) class on an Ethernet port 721 of a corresponding IO device 701 so that the corresponding IO device 701 must stop transmitting packets for a specified time on the specified QoS class on the Ethernet port 721 that is being back pressured.

WACC disaggregated networking switching system 700 does not have H-VIQs in an FSP 704 and no QCN. PFC may be enabled on all M fabric planes between each FSP 704 and each Ethernet switch 706, Ethernet fabric plane, in both an Ethernet switch 706 to FSP 704 direction and an FSP 704 to Ethernet switch 706 direction. Ingress metering may also be utilized on an egress FSP 704 to identify a hot link and apply PFC on that identified link.

Figure 8:
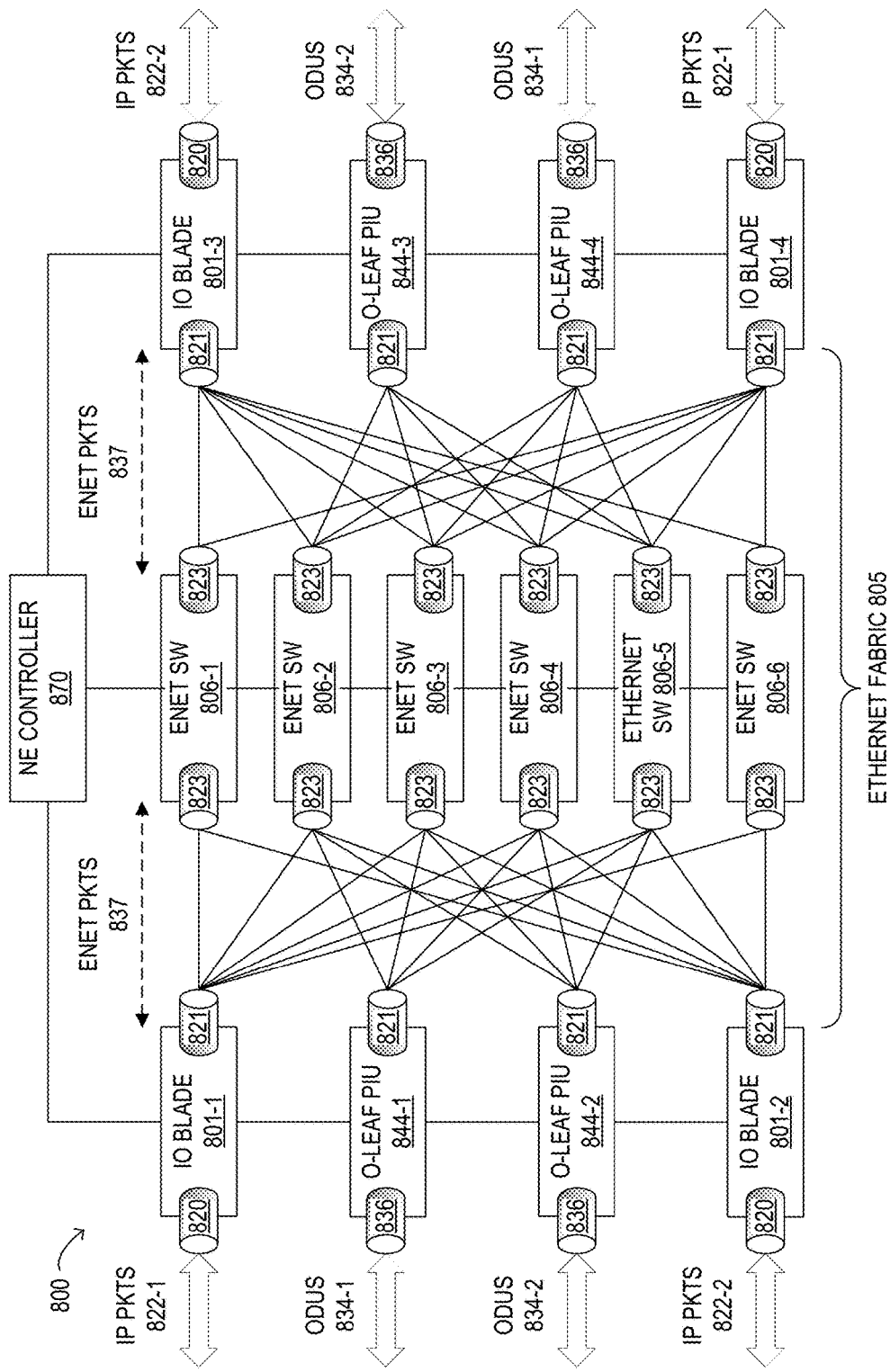
FIG. 8 is a block diagram of a hybrid OTN, IP, and Ethernet switching system.

Referring now to FIG. 8, a block diagram of selected elements of a hybrid optical transport network (OTN), IP, and Ethernet switching system 800 is illustrated. Hybrid OTN, IP, and Ethernet switching system 800 may include, but is not limited to, a set of O IO blades 801 including IO blades 801-1, 801-2, 801-3, and 801-4, a set of Q optical transport network leaf (O-Leaf) plug-in universal (PIU) modules 844 including O-Leaf PIU modules 844-1, 844-2, 844-3, and 844-4, a set of M Ethernet switches 806 including Ethernet switches 806-1, 806-2, 806-3, 806-4, 806-5, and 806-6, and a NE controller 870. A variable u may have a value ranging from 1 to O to denote the uth IO blade 801 of the set of IO blades 801 and a variable v may have a value ranging from 1 to Q to denote the vth O-Leaf PIU module 844 of the set of Q O-Leaf PIU modules 844.

IO blades 801 and Ethernet switches 806 are structurally and functionally similar to IO blades 201 and IO blades 401, and Ethernet switches 206 and Ethernet switches 406, respectively, described above with reference to FIGS. 2, 4A, 4B, 4C, 4D, 4E, and 4F. Each Ethernet switch 806 of the set of M Ethernet switches 806 may have a set of N switch ports 823, as previously described. The set of M Ethernet switches 806 may have a subset of H Ethernet switches 806 and a subset of L Ethernet switches 806. The sum of the number H and the number L may be less than or equal to the number M. A variable f may have a value ranging from 1 to H to denote the fth Ethernet switch 806 of the set of M Ethernet switches and a variable g may have a value from 1+H to M to denote the gth Ethernet switch 806 of the set of M Ethernet switches 806. Each IO blade 801 of the set of O IO blades 801 may include at least one IO port 820 for receiving and transmitting IP packet streams 822 and a set of M Ethernet ports 821 for receiving and transmitting Ethernet packets 837, as previously described with reference to IO blade 201 of FIG. 2. Each O-Leaf PIU module 844 may include at least one OTN IO port 836 for transmitting or receiving optical data unit (ODU) streams 834 and a set of L Ethernet ports 821 for receiving and transmitting Ethernet packets 837. A variable z may have a value ranging from 1 to L to denote the zth Ethernet port 821 of the set of L Ethernet ports 821.

The ith Ethernet port 821 of the set of M Ethernet ports 821 of the uth IO blade 801 of the set of O IO blades 801 may be connected to the uth switch port 823 of the set of N switch ports 823 of the ith Ethernet switch 806 of the set of M Ethernet switches 806. The zth Ethernet port 821 of the set of L Ethernet ports 821 of the vth O-Leaf PIU module 844 of the set of Q O-Leaf PIU modules 844 may be connected to the O+vth switch port 823 of the set of N switch ports 823 of the gth Ethernet switch 806 of the set of M Ethernet switches 806. The sum of the number O and the number Q may be less than or equal to the number N.

In the exemplary embodiment illustrated in FIG. 8, O equals 4, Q equals 4, N equals 8, M equals 6, H equals 2, and L equals 4. Each IO blade 801 has 400G external interfaces, IO ports 820, and connects to all 6 Ethernet switches 806 with 6×100GE Ethernet interfaces. Each O-Leaf PIU module 844 has 200G external interfaces, OTN IO ports 836, and connects to the middle 4 Ethernet switches 806, Ethernet switches 806-2, 806-3, 806-4, and 806-5.

During operation, a traffic allocation algorithm may be applied on each IO blade 801 so that the Ethernet traffic transmitted over each Ethernet switch 806 of Ethernet switches 806-2, 806-3, 806-4, and 806-5 will not exceed 80 Gbps or 80% of its traffic capacity but will fully utilize each IO blades 801 links to the set of 6 Ethernet switches. The Ethernet traffic transmitted over each Ethernet switch 806 of Ethernet switches 806-1 and 806-6 may be up to 100 Gbps or 100% of its traffic capability. The total Ethernet fabric side traffic from each IO blade 801 may be up to 520 Gbps, which is a 30% speed up for a 400 Gbps external interface. The ingress VOQ structure of each IO blade 801 is modified as described above to use different weights for different Ethernet switches 806. The egress VIQ and flow control of each IO blade 801 may be modified to ensure that the IO blade 801 does not emit more than 80Gps of Ethernet traffic on the links to Ethernet switches 806-2, 806-3, 806-4, and 806-5.

O-leaf PIU modules 844 and Ethernet switch fabric 805 are configured to function as an OTN switch, in which optical signals having optical data unit (ODU) stream headers connected to O-leaf PIU modules 844 may be interconnected and logically switched among O-leaf PIU modules 844. Each of O-leaf PIU modules 844 may function as a transceiver, with OTN IO ports 836 being respectively converted from ODUs 834 each having an ODU header to Ethernet packets 837 each having an Ethernet switching header that are then switchable by one or more Ethernet switches 806.

Figure 9:
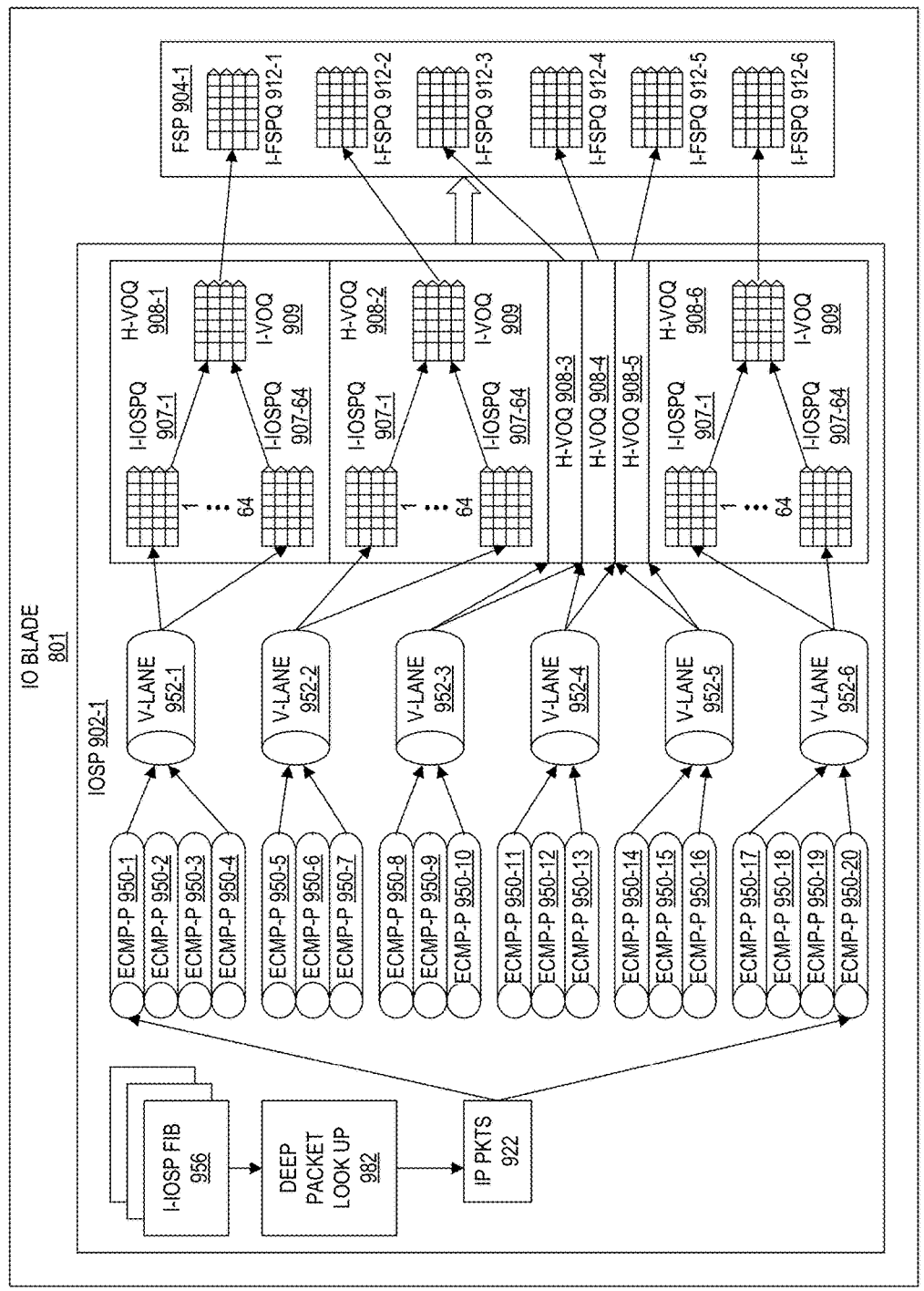
FIG. 9 is a block diagram of an ingress IO side packet processor with equal cost multi-path pipes.

Referring now to FIG. 9, a block diagram of selected elements of an IO blade 801 with equal cost multi-path (ECMP) pipes is illustrated. Elements of IO blade 801 may include, but are not limited to, an IOSP 902-1 and a FSP 904-1. IOSP 902-1 and FSP 904-1 are structurally and functionally similar to IOSP 402 and FSP 404, respectively described above with reference to FIGS. 4A, 4B, 4C, 4D, 4E, and 4F.

IOSP 902-1 may include I-IOSP FIB 956, a deep packet look-up algorithm 982, and a deep memory buffer 910 including H-VOQ 908-1 to H-VOQ 908-6. FSP 904-1 may include I-FSPQs 912 including I-FSPQs 912-1, 912-2, 912-3, 912-4, 912-5, and 912-6.

During operation, IOSP 902-1 may create M virtual lanes 952 including H virtual lanes 952 and L virtual lanes 952, each virtual lane 952 of the M virtual lanes 952 corresponding to a respective H-VOQ 908 of the set of M H-VOQs 908. IOSP 902-1 may also create A ECMP pipes 950 including B ECMP pipes 950 for each respective virtual lane 952 of the H virtual lanes 952 and C ECMP pipes 950 for each respective virtual lane 952 of the L virtual lanes 952. Each of the A ECMP pipes 950 may connect to one of the M virtual lanes 952 and each of the M virtual lanes 952 may connect to at least one of the A ECMP pipes 950. Each of the H virtual lanes 952 of the M virtual lanes 952 may connect to each of the respective B ECMP pipes 950 and each of the L virtual lanes 952 of the M virtual lanes 952 may connect to each of the respective C ECMP pipes 950.

The A ECMP Pipes 950 provide an Ethernet traffic allocation to allow ECMP to function over uneven bandwidth amongst various virtual lanes 952 when the number B of the B ECMP pipes 950 is different than the number C of the C ECMP pipes 950. In FIG. 9, the total number A of the A ECMP pipes 950 is equal to 20, the number B is equal to 4, and the number C is equal to 3. Each ECMP pipe 950 represents a 25 Gbps virtual plane. The set of 4 ECMP pipes 950 including ECMP pipes 950-1, 950-2, 950-3, and 950-4 are connected to virtual lane 952-1, and the set of 4 ECMP pipes 950 including ECMP pipes 950-17, 950-18, 950-19, and 950-20 are connected to virtual lane 952-6. Each of virtual lanes 952-1 and 952-6 may represent a 100 Gbps, 4×25 Gbps, virtual lane 952. The set of 3 ECMP pipes 950 including ECMP pipes 950-5, 950-6, and 950-7 are connected to virtual lane 952-2, the set of 3 ECMP pipes 950 including ECMP pipes 950-8, 950-9, and 950-10 are connected to virtual lane 952-3, the set of 3 ECMP pipes 950 including ECMP pipes 950-11, 950-12, and 950-13 are connected to virtual lane 952-4, and the set of 3 ECMP pipes 950 including ECMP pipes 950-14, 950-15, and 950-16 are connected to virtual lane 952-5. Each of virtual lanes 952-2, 952-3, 952-4 and 952-5 may represent a 75 Gbps, 3×25 Gbps virtual lane 952. By allocating the ECMP pipes 950 in this manner, the Ethernet traffic of each Ethernet switch 806-1 and 806-6 corresponding to virtual lanes 952-1 and 952-6 respectively may be up to 100% of traffic capacity of each Ethernet switch 806, and the Ethernet traffic of each Ethernet switch 806-2, 806-3, 806-4 and 806-5 corresponding to virtual lanes 952-2, 952-3, 952-4, and 952-5 respectively may not exceed 75% of traffic capacity of each Ethernet switch 806.

In one or more embodiments, the same number of ECMP pipes 950 of the A ECMP pipes 950 may be connected to each virtual lane 952 of the M virtual lanes 952. In this case, the number H of the H virtual lanes 952 may be equal to the number M of the M virtual lanes 952, the number L of the L virtual lanes 952 may be equal to O, the number C of the C ECMP pipes 950 may be equal to O, and each virtual lane 952 may be connected to the number B of the B ECMP pipes 950. By allocating the ECMP pipes 950 in this manner, the Ethernet traffic of each Ethernet switch 806-1, 806-2, 806-3, 806-4, 806,5, and 806-6 corresponding to virtual lanes 952-1, 952-2, 952-3, 952-4, 952-5, and 952-6 respectively may be up to 100% of traffic capacity of each Ethernet switch 806.

In one or more embodiments, a different number of ECMP pipes 950 of the A ECMP pipes 950 may be connected to each virtual lane 952 of the M virtual lanes 952 such that no virtual lane 952 of the M virtual lanes 952 is connected to the same number of ECMP pipe 950. By allocating the ECMP pipes 950 in this manner, the Ethernet traffic of each Ethernet switch 806-1, 806-2, 806-3, 806-4, 806,5, and 806-6 corresponding to virtual lanes 952-1, 952-2, 952-3, 952-4, 952-5, and 952-6 respectively may be up to a different percentage of traffic capacity of each Ethernet switch 806 such that no Ethernet switch 806 carrier the same amount of Ethernet traffic.

The IOSP may also generate micro-flows by 5-Tuple look-up based on packet header information of a received IP packet and an I-IOSP forwarding information base (FIB). The IOSP may further distribute the micro-flows into the A ECMP pipes. The IOSP may also queue the IP packet including first metadata to an I-IOSPQ of an H-VOQ that may correspond to an egress IO device and a switch number of a corresponding Ethernet switch based on the micro-flows and an identified micro-flow for an ECMP hash key in a ECMP pipe hash of the IOSP.

In one or more embodiments, the number O of the set of O IO devices 801 may be equal to the number N of the set of N Ethernet ports 823 of each Ethernet switch 806, the number B of the B ECMP pipes 950 may be greater than the number C of the C ECMP pipes 950, and packet traffic bandwidth of the first virtual lane 952 may be greater than the packet traffic bandwidth of the second virtual lane 952.

In one or more embodiments, the M virtual lanes 952 may further include a third virtual lane 952. The A ECMP pipes 950 may further include D ECMP pipes 950, each of the D ECMP pipes 950 may corresponds to the third virtual lane 952. The number C of the C ECMP pipes 950 may be greater than the number D of the D ECMP pipes 950, and the packet traffic bandwidth of the second virtual lane 952 may be greater than the packet traffic bandwidth of the third virtual lane 952.

In one or more embodiments, the number O of the set of O IO devices 801 may be equal to the number N of the set of N Ethernet ports 823 of each Ethernet switch 806. The M virtual lanes 952 may further include a third virtual lane 952. The A ECMP pipes 950 may further include D ECMP pipes 950, each of the D ECMP pipes 950 may correspond to the third virtual lane 952. The number B of the B ECMP pipes 950 may be equal to the number C of the C ECMP pipes 950, the number C of the C ECMP pipes 950 may be equal to the number D of the C ECMP pipes 950, packet traffic bandwidth of the first virtual lane 952 may be equal to the packet traffic bandwidth of the second virtual lane 952, and packet traffic bandwidth of the second virtual lane 952 may be equal to the packet traffic bandwidth of the third virtual lane 952.

In one or more embodiments, the OTN, IP, and Ethernet switching system 800 may also include a set of Q optical transport network leaf (O-leaf) plug-in universal (PIU) modules 844 each comprising a set of L Ethernet ports 821. A variable v may have a value ranging from 1 to Q to denote the vth O-leaf PIU module 844, a variable z may have a value ranging from 1 to L to denote the zth Ethernet port 821, and a variable g may have a value ranging from 1+H to M to denote the gth Ethernet switch 806. The zth Ethernet port 821 of the set of L Ethernet ports 821 of the vth O-leaf PIU module 844 may be connected to the O+vth switch port 823 of the set of N switch ports 823 of the gth Ethernet switch 806.

When IOSP 902-1 receives an IP packet 922, IOSP 902-1 may utilize a deep packet look-up algorithm 982 to determine an egress IO blade 801 of the set of N IO blades 801 and an egress port number of the egress IO blade 801 based on packet header information of received IP packet 922 including packet headers (PHS) 423 and I-IOSP FIB 956. IOSP 902-1 may classify the IP packet 922 to a flow and a traffic class based on the packet header information, the egress IO device, and the egress port number. IOSP 902-1 may utilize 5-Tuple deep look-up to create micro-flows based on packet header information, the egress IO device, and the egress port number. IOSP 902-1 may then distribute the micro-flows into all of the ECMP pipes 950 created. The ECMP pipes 950 created includes the set of A ECMP pipes 950 for each virtual lane 952 of the subset of H virtual lanes 952 and the set of B ECMP pipes 950 for each virtual lane 952 of the subset of L virtual lanes 952. The total number of ECMP pipes 950 is equal to the number A×H+B×L. In FIG. 9, A equals 4, H=2, B=3, L=4, and the total number of ECMP pipes 950 is equal to 20. Once the IP packet 922 has been distributed over all of the ECMP pipes 950, IOSP 902-1 may, as previously described with reference to FIG. 4D, generate a switch number of a corresponding Ethernet switch 806 based on the micro-flow, queue IP packet 922 to an I-IOSPQ 907 of an H-VOQ 908 corresponding respectively to the egress IO device and the switch number. IOSP 902-1 may de-queue the IP packet 922 from the respective I-VOQ 909 of the respective H-VOQ 908 using a scheduling algorithm and transmit the de-queued IP packet 922 to FSP 904-1. As previously described with reference to FIG. 4D, FSP 904-1 may create an Ethernet packet 837. FSP 904-1 may queue Ethernet packet 837 to an I-FSPQ 912 corresponding to the switch number 498 of IP packet 922. FSP 904-1 may de-queue Ethernet packet 837 from the I-FSPQ 912 using the scheduling algorithm. FSP 904-1 may also transmit the de-queued Ethernet packet 837 to the egress IO blade 801 via an Ethernet switch 806 corresponding to the switch number 498.

In one or more embodiments, when a virtual plane fails, the ECMP pipes 950 riding on the virtual plane will also fail. The microflow shall be reallocated into the remaining working ECMP pipes 950.

Figure 10:
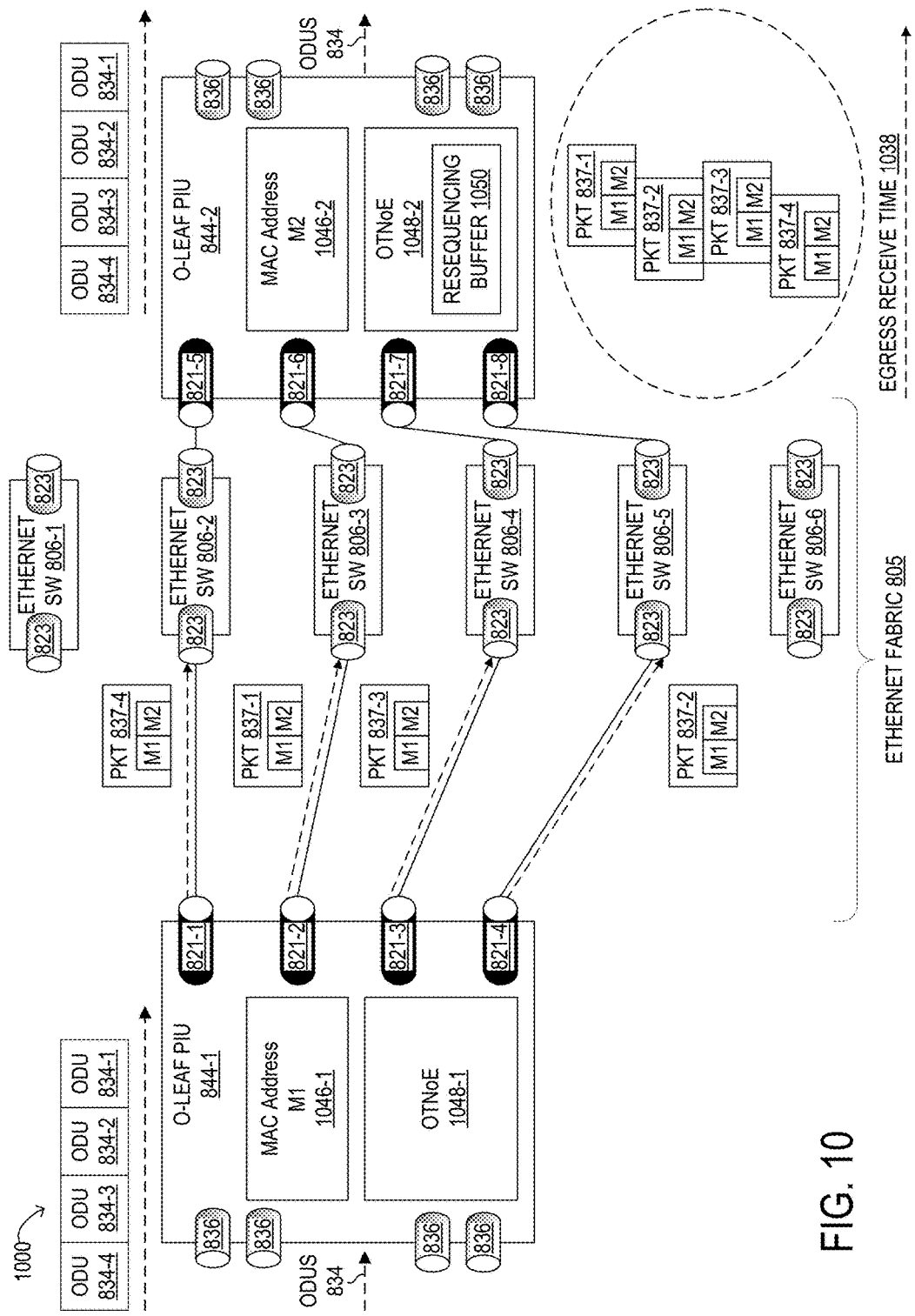
FIG. 10 is a block diagram of O-Leaf PIU modules in a hybrid OTN, IP, and Ethernet switching system.

Referring now to FIG. 10, a block diagram of an example of optical data unit (ODU) forwarding over Ethernet fabric 805 in a hybrid OTN and IP and Ethernet switching system 1000 is illustrated. In FIG. 10, hybrid OTN, IP, and Ethernet switching system 1000 is shown in a schematic representation and is not drawn to scale or perspective. It is noted that, in different embodiments, hybrid OTN, IP, and Ethernet switching system 1000 may be operated with additional or fewer elements.

In FIG. 10, optical data units (ODU) including ODU 834 may enter Hybrid OTN, IP, and Ethernet switching system 1000 in sequence (834-1, 834-2, 834-3, 834-4) at ingress O-leaf PIU module 844-1, depicted by ODU switched connection 836-1 representing the arrival of in sequence ODUs 834 at ingress O-leaf PIU module 844-1. ODU 834s may exit hybrid OTN and IP and Ethernet switching system 1000 at egress O-leaf PIU module 844-2 in the same sequence as in ODU switched connection 836-1. In other words, ODU switched connection 836-1 maintains the same sequence of departure of ODU 834s at egress O-leaf PIU module 844-2 as their in-sequence arrival at ingress O-leaf PIU module 844-1.

In FIG. 10, hybrid OTN, IP, and Ethernet switching system 1000 may establish ODU switched connection 836-1 to enable ODU forwarding of Ethernet packets over Ethernet fabric 805 from O-leaf PIU module 844-1 to O-leaf PIU module 844-2. ODU switched connection 836-1 may include connections from each of Ethernet ports 821 of ingress O-leaf PIU module 844-1 to each of Ethernet switches 806 including the connection from port 821-1 to Ethernet switch 806-2, the connection from port 821-2 to Ethernet switch 806-3, the connection from port 821-3 to Ethernet switch 806-4, and the connection from port 821-4 to Ethernet switch 806-5. ODU switched connection 836-1 may also include connections from each of Ethernet switches 806 to each of Ethernet ports 821 of egress O-leaf PIU module 844-2 including the connection from Ethernet switch 806-2 to Ethernet port 821-1, the connection from Ethernet switch 806-3 to Ethernet port 821-2, the connection from Ethernet switch 806-4 to Ethernet port 821-3, and the connection from Ethernet switch 806-5 to Ethernet port 821-4. It is noted that in different embodiments, hybrid OTN and IP and Ethernet switching system 1000 may establish multiple ODU switched connections 836 (not shown in FIG. 8), each ODU switched connection 836 to enable ODU forwarding over Ethernet fabric 805 from one O-leaf PIU module 844 of multiple O-leaf PIU modules 844 to another O-leaf PIU module 844 of multiple O-leaf PIU modules 844.

OTNoE 1048-1 of hybrid OTN, IP, and Ethernet switching system 1000 may receive in sequence ODUs 834 at ingress O-leaf PIU module 844-1. Each ODU 834 may include an ODU header having information that indicates an ingress (also referred herein as a source) O-leaf PIU module 844 and an egress (also referred herein as a destination) O-leaf PIU module 844. OTNoE 1048-1 uses the information associated with each ODU 834 to determine the destination egress O-leaf PIU module 844. In the example embodiment, ODUs 834 each include information that indicates ingress O-leaf PIU module 844 is O-leaf PIU module 844-1 and egress O-leaf PIU module 844 is O-leaf PIU module 844-2. It is noted that in different embodiments, the ODU headers of associated ODUs 834 each may include information that indicates the associated ingress O-leaf PIU module 844 is the same or different amongst ODUs 834 and the associated egress O-leaf PIU module 844 is the same or different amongst ODUs 834.

In hybrid OTN, IP, and Ethernet switching system 1000, each O-leaf PIU module 844 is assigned its own unique identifier. The unique identifier may be assigned by Network element controller 870 during a configuration process of hybrid OTN, IP, and Ethernet switching system 1000 or by Network element controller 870 when each O-leaf PIU module 844 is added to hybrid OTN, IP, and Ethernet switching system 1000. PIU module identifier may be a media access control (MAC) address, a virtual local area network (VLAN) identifier, and the like. In the example embodiment, O-leaf PIU module 844-1 is assigned MAC address M1 1046-1 and O-leaf PIU module 844-2 is assigned MAC address M2 1046-2.

OTNoE 1048-1 determines from information included in each ODU header of associated ODUs 834 that the destination egress O-leaf PIU module 844 is O-leaf PIU module 844-2 and generates each Ethernet packet 837 (PKT) including PKT 837-1 through PKT 837-4 from each corresponding ODU 834-1 through ODU 834-4, respectively. In the example embodiment, there is a one to one correspondence between ODU 834-1 through ODU 834-4 and PKT 837-1 through PKT 837-4. Each generated PKT 837 includes an Ethernet switching header which may include information from each ODU header of associated ODUs 834. Each Ethernet switching header of generated PKTs 837 may also include information that indicates the source MAC address of the ingress PIU module and the destination MAC address of the egress PIU module, where the source MAC address is MAC address M1 1046-1 of ingress O-leaf PIU module 844-1 and the destination MAC address is MAC address M2 1046-2 of egress O-leaf PIU module 844-2, as indicated by M1 and M2 of PKTs 837. The source and destination MAC addresses may be a unicast MAC address, a multicast MAC address, a broadcast MAC address, and the like. The generated PKTs 837 may further include a sequence number assigned to each PKT 837 that indicates the in-sequence order of PKTs 837 that corresponds to the in-sequence arrival order of ODUs 834. The sequence number of each packets is utilized by the destination egress O-leaf PIU module 844 to recover and maintain the in-sequence arrival order of ODUs 834 at O-leaf PIU module 844-1, described in further detail below. The generated PKTs 837 may be for transmission via ODU switched connection 836-1 corresponding to ingress O-leaf PIU module 844-1 and egress O-leaf PIU module 844-2.

OTNoE 1048-1 selects one of Ethernet ports 821 for transmission of each PKT 837 of PKTs 837 and transmits each PKT 837 of PKTs 837 from its selected Ethernet port 821 of O-leaf PIU module 844-1 over Ethernet switch 806 corresponding to the selected Ethernet port 821. In the example embodiment, OTNoE 1048-1 selects port 821-1 for transmission of PKT 837-4 and transmits PKT 837-4 from port 821-1 over Ethernet switch 806-2, depicted by the dashed arrow from port 821-1 to Ethernet switch 806-2. Similarly, OTNoE 1048-1 selects port 821-2 and transmits PKT 837-1 from port 821-2 over Ethernet switch 806-3, depicted by the dashed arrow from port 821-2 to Ethernet switch 806-3, selects port 821-3 and transmits PKT 837-3 from port 821-3 over Ethernet switch 806-4, depicted by the dashed arrow from port 821-3 to Ethernet switch 806-4, and selects port 821-4 and transmits PKT 837-2 from port 821-4 over Ethernet switch 806-5, depicted by the dashed arrow from port 821-4 to Ethernet switch 806-5. The connections between ports 821-1 through ports 821-4 and Ethernet switches 806-2 through 806-5 allow an ingress O-leaf PIU module 844 to transmit PKTs 837 in parallel on all available Ethernet switches 806-2, 806-3, 806-4, and 806-5. When all L Ethernet switches 806-2, 806-3, 806-4, and 806-5 are available during normal operation, Ethernet fabric 805 is in a 0: L load sharing mode. When one of Ethernet switches 806 is unavailable, e.g. due to an equipment failure, an interconnect cable failure, or maintenance, an ingress O-leaf PIU module 844 transmits PKTs 837 on all remaining available Ethernet switches 806-2, 806-3, 806-4, and 806-5, and therefore, realize fabric protection Ethernet switching.

OTNoE 1048-2 may include a re-sequencing buffer 870 to store PKTs 837 received at Ethernet ports 821 of O-leaf PIU module 844-2. OTNoE 1048-2 receives PKTs 837 from Ethernet switches 806 at Ethernet ports 821 of O-leaf PIU module 844-2 corresponding to ports 821 of O-leaf PIU module 844-1 and stores PKTs 837 at re-sequencing buffer 870 of OTNoE 1048-2. In the example embodiment, OTNoE 1048-2 receives PKT 837-4 at port 821-5, PKT 837-1 at port 821-6, PKT 837-3 at port 821-7, and PKT 837-2 at port 821-8 and stores PKT 837-1 through PKT 837-4 at re-sequencing buffer 870. During operation, Ethernet fabric 805 may be in load sharing mode, where multiple PKTs 837 may be in transmission over multiple Ethernet switches 806-2, 806-3, 806-4, and 806-5 resulting in arrival packet jitter, which may be intrinsic packet jitter or extrinsic packet jitter.

Intrinsic packet jitter may be due to differences amongst O-leaf PIU modules 844, interconnects, e.g. cables, Ethernet switches 806-2, 806-3, 806-4, and 806-5, and other components that may comprise hybrid OTN and IP and Ethernet switching system 1000. Extrinsic packet jitter may be due to multiple ingress O-leaf PIU modules 844 transmitting multiple Ethernet packets 837 to the same port of the same egress O-leaf PIU module 844 resulting in varied Ethernet packet arrival times. In other words, intrinsic packet jitter may be defined as originating from all causes other than Ethernet packet 837 collisions or retransmissions, which may be defined as causes for extrinsic packet jitter. In particular, hybrid OTN and IP and Ethernet switching system 1000 is designed and operated to minimize or eliminate extrinsic packet jitter, such that variations in egress receive time 838 may be assumed to be relatively small and originate from intrinsic packet jitter.

Ethernet fabric 805 operating in load sharing mode may result in Ethernet packets 837 arriving at Ethernet ports 821 of O-leaf PIU module 844-2 out of sequence to their transmission sequence from O-leaf PIU module 844-1. In the example embodiment, PKT 837-1 arrives first as depicted by its arrival time with respect to egress receive time 838, PKT 837-3 arrives next, PKT 837-2 arrives next, and PKT 837-4 arrives last. As illustrated, PKTs 837 also overlap each other with respect to egress receive time 838.

OTNoE 1048-2 re-assembles ODU 834-1 through ODU 834-4 including re-assembling each ODU header of each ODU 834 from PKT 837-1 through PKT 837-4 stored at re-sequencing buffer 870. OTNoE 1048-2 re-sequences ODU 834-1 through ODU 834-4 into the same sequence that corresponds to the in-sequence arrival order of ODUs 834 at O-leaf PIU module 844-1 based on the sequence number assigned to each PKT 837 that corresponds to the in-sequence arrival order of ODUs 834. OTNoE 1048-2 re-assembles each ODU header of each ODU 834 based on information included in each Ethernet switching header of each PKT 837. Once the ODUs 834 are re-assembled and re-sequenced, the ODUs 834 may exit hybrid OTN, IP, and Ethernet switching system 1000 at egress O-leaf PIU module 844-2 in the same sequence as they entered hybrid OTN, IP, and Ethernet switching system 1000 at ingress O-leaf PIU module 844-1.

Figure 11:
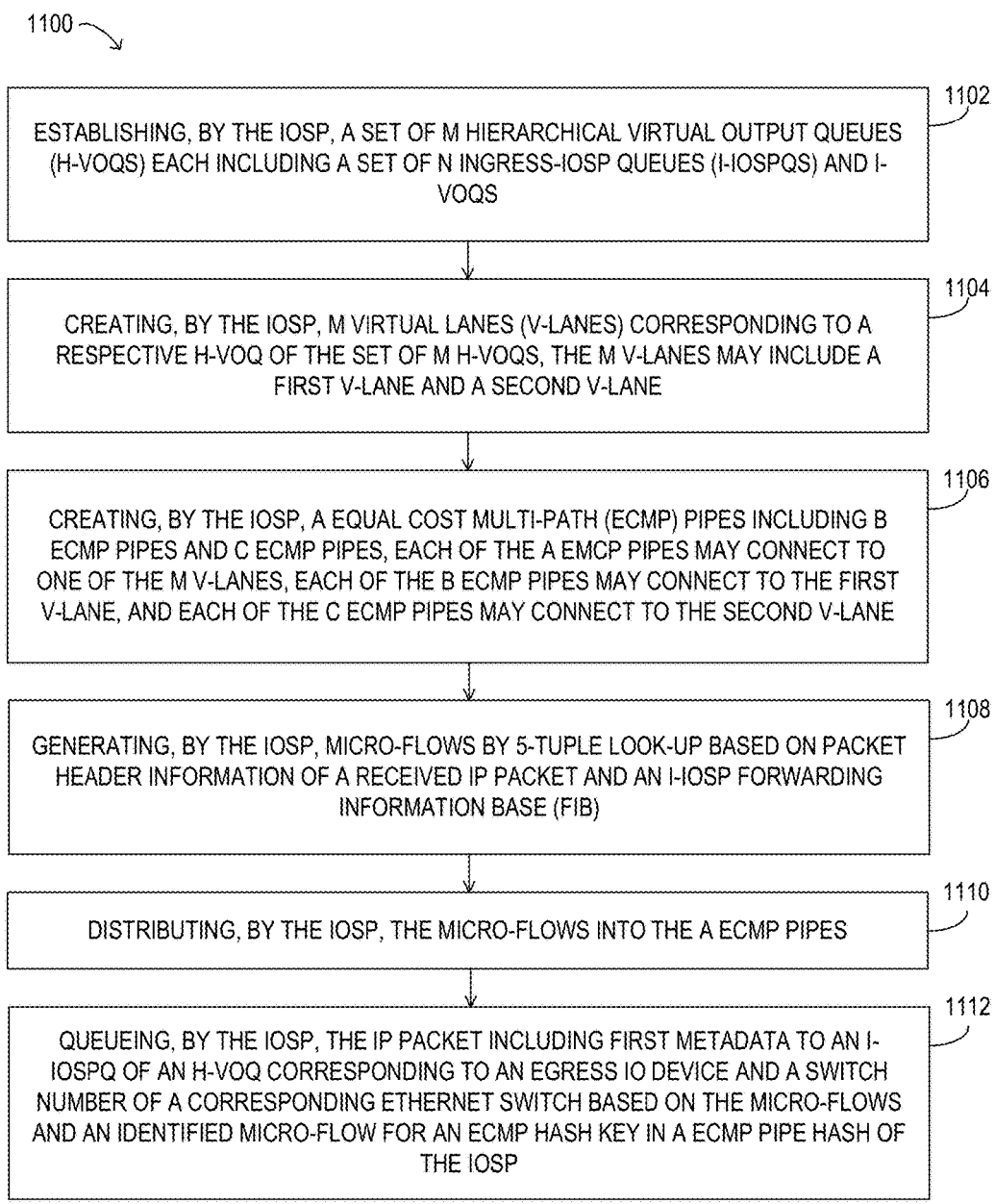
FIG. 11 is a flowchart of selected elements of an embodiment of a method for switching ODUs and IP packet as Ethernet packets.

Referring now to FIG. 11, a flowchart of selected elements of an embodiment of a method 1100 for switching ODUs and IP packets as Ethernet packets, as described herein, is depicted. In various embodiments, method 1100 may be performed using OTN, IP, and Ethernet switching system 800 as previously described with reference to FIG. 8. It is noted that certain operations described in method 1100 may be optional or may be rearranged in different embodiments.

The OTN, IP, and Ethernet switching system of method 1100 may include an Ethernet fabric including a set of M Ethernet switches each comprising a set of N switch ports. A variable i may have a value ranging from 1 to M to denote the ith Ethernet switch of the set of M Ethernet switches and a variable j may have a value ranging from 1 to N to denote the jth switch port of the set of N switch ports. The OTN, IP, and Ethernet switching system may also include a set of O input/output (IO) devices each including a set of M Ethernet ports. A variable u may have a value ranging from 1 to O to denote the uth IO device of the set of O IO devices. The jth Ethernet port of the uth IO device may be connected to the uth switch port of the ith Ethernet switch. The OTN, IP, and Ethernet switching system may further include an IO side packet processor (IOSP).

Method 1100 may begin at step 1102, by establishing, by the IOSP, a set of M hierarchical virtual output queues (H-VOQs) each including a set of N ingress-IOSP queues (I-IOSPQs) and I-VOQs. At step 1104, creating, by the IOSP, M virtual lanes (v-lanes) corresponding to a respective H-VOQ of the set of M H-VOQs, the M v-lanes may include a first v-lane and a second v-lane. At step 1106, creating, by the IOSP, A equal cost multi-path (ECMP) pipes including B ECMP pipes and C ECMP pipes, each of the A ECMP pipes may connect to one of the M v-lanes, each of the B ECMP pipes may connect to the first v-lane, and each of the C ECMP pipes may connect to the second v-lane. At step 1108, generating, by the IOSP, micro-flows by 5-Tuple look-up based on packet header information of a received IP packet and an I-IOSP forwarding information base (FIB). At step 1110, distributing, by the IOSP, the micro-flows into the A ECMP pipes. At step 1112, queueing, by the IOSP, the IP packet including first metadata to an I-IOSPQ of an H-VOQ corresponding to an egress IO device and a switch number of a corresponding Ethernet switch based on the micro-flows and an identified micro-flow for an ECMP hash key in a ECMP pipe hash of the IOSP.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. An optical transport network (OTN), Internet Protocol (IP), and Ethernet switching system comprising:
an Ethernet fabric including a set of M Ethernet switches each comprising a set of N switch ports, wherein a variable i having a value ranging from 1 to M to denote the ith Ethernet switch of the set of M Ethernet switches and a variable j having a value ranging from 1 to N to denote the jth switch port of the set of N switch ports;
a set of O input/output (IO) devices each comprising:
a set of M Ethernet ports, wherein a variable u having a value ranging from 1 to O to denote the uth IO device of the set of O IO devices, and wherein the jth Ethernet port of the uth IO device is connected to the uth switch port of the ith Ethernet switch;
an IO side packet processor (IOSP) configured to:
establish a set of M hierarchical virtual output queues (H-VOQs) each comprising a set of N ingress-IOSP queues (I-IOSPQs) and I-VOQs;
create M virtual lanes (v-lanes) including a first v-lane and a second v-lane, each of the M v-lanes corresponds to a respective H-VOQ of the set of M H-VOQs;
create A equal cost multi-path (ECMP) pipes including B ECMP pipes and C ECMP pipes, each of the A ECMP pipes connects to one of the M v-lanes, each of the B ECMP pipes connects to the first v-lane, and each of the C ECMP pipes connects to the second v-lane;
generate micro-flows by 5-Tuple look-up based on packet header information of a received IP packet and an I-IOSP forwarding information base (FIB);
distribute the micro-flows into the A ECMP pipes; and
queue the IP packet including first metadata to an I-IOSPQ of an H-VOQ corresponding to an egress IO device and a switch number of a corresponding Ethernet switch based on the micro-flows and an identified micro-flow for an ECMP hash key in a ECMP pipe hash of the IOSP.

2. The OTN, IP, and Ethernet switching system of claim 1, wherein the number O of the set of O IO devices is equal to the number N of the set of N Ethernet ports, wherein the number B of the B ECMP pipes is greater than the number C of the C ECMP pipes and packet traffic bandwidth of the first v-lane is greater than the packet traffic bandwidth of the second v-lane.

3. The OTN, IP, and Ethernet switching system of claim 2, wherein the M v-lanes further includes a third v-lane, wherein the A ECMP pipes further includes D ECMP pipes, each of the D ECMP pipes corresponds to the third v-lane, and wherein the number C of the C ECMP pipes is greater than the number D of the D ECMP pipes, and the packet traffic bandwidth of the second v-lane is greater than the packet traffic bandwidth of the third v-lane.

4. The OTN, IP, and Ethernet switching system of claim 1, wherein the number O of the set of O IO devices is equal to the number N of the set of N Ethernet ports, wherein the M v-lanes further includes a third v-lane, wherein the A ECMP pipes further includes D ECMP pipes, each of the D ECMP pipes corresponds to the third v-lane, and wherein the number B of the B ECMP pipes is equal to the number C of the C ECMP pipes, the number C of the C ECMP pipes is equal to the number D of the C ECMP pipes, packet traffic bandwidth of the first v-lane is equal to the packet traffic bandwidth of the second v-lane, and packet traffic bandwidth of the second v-lane is equal to the packet traffic bandwidth of the third v-lane.

5. The OTN, IP, and Ethernet switching system of claim 1, further comprising:
   a set of Q optical transport network leaf (O-leaf) plug-in universal (PIU) modules each comprising a set of L Ethernet ports, wherein a variable v having a value ranging from 1 to Q to denote the vth O-leaf PIU module, a variable z having a value ranging from 1 to L to denote the zth Ethernet port, and a variable g having a value ranging from 1+H to M to denote the gth Ethernet switch, and wherein the zth Ethernet port of the set of L Ethernet ports of the vth O-leaf PIU module is connected to the O+vth switch port of the set of N switch ports of the gth Ethernet switch.

6. The OTN, IP, and Ethernet switching system of claim 1, wherein the set of Q O-leaf PIU modules includes a first O-leaf PIU module and a second O-leaf PIU module, wherein the first O-leaf PIU module configured to:
   establish a first optical data unit (ODU) switched connection from the first O-leaf PIU module to the second O-leaf PIU module via the subset of L Ethernet switches of the M Ethernet switches;
   select a first sequential order of the subset of L Ethernet switches;
   receive a first ODU at the first O-leaf PIU module and generate a second Ethernet packet corresponding to the first ODU, wherein the first ODU is for transmission via the first ODU switched connection; and
   transmit the second Ethernet packet from a first Ethernet port of the set of L Ethernet ports of the first O-leaf PIU module, wherein the first Ethernet port is selected based on the first sequential order.

7. The OTN, IP, and Ethernet switching system of claim 1, wherein each Ethernet switch of the set of M Ethernet switches to establish switch queues;
   wherein the first Ethernet switch of the set of M Ethernet switches configured to:
   identify an egress port of the set of N switch ports of the first Ethernet switch based on packet header information of the received first Ethernet packet including an egress port number of first metadata, the first metadata, and a first MAC header from an ingress IO device of the set of O IO devices;
   generate a second MAC header based on the egress port number and an egress IO device of the set of O IO devices of the first metadata;
   generate second metadata from the first metadata by removing the egress IO device;
   queue the packet data, the second metadata, and the second MAC header to switch queues of the first Ethernet switch;
   de-queue the packet data, the second metadata, and the second MAC header from the switch queues using a scheduling algorithm; and
   transmit a second Ethernet packet including the de-queued packet data, the second metadata, and the second MAC header to the egress IO device via the egress port of the first Ethernet switch.

8. The OTN, IP, and Ethernet switching system of claim 1, each IO device further comprising:
   a set of W IO ports, wherein a variable x having a value ranging from 1 to W to denote the xth IO port of the set of W IO ports, wherein
   the IOSP further configured to:
   establish a set of W egress-IOSP queues (E-IOSPQs), wherein the xth E-IOSPQ corresponds to an xth IO port of the set of W IO ports of the IO device;
   de-queue the IP packet including the first metadata from the I-VOQs of the H-VOQ using a scheduling algorithm; and
   transmit the de-queued IP packet including the first metadata to the FSP of the ingress IO device, wherein
   the FSP further configured to:
   establish a set of M ingress-FSP queues (I-FSPQs), wherein the ith I-FSPQ corresponds to the ith Ethernet switch;
   generate a first Ethernet packet including the packet data of the IP packet, second metadata based on the first metadata, and a first media access control (MAC) header;
   queue the first Ethernet packet to an I-FSPQ corresponding to the switch number of the first metadata;
   de-queue the first Ethernet packet including the packet data of the IP packet, the second metadata, and the first MAC header from the I-FSPQ using the scheduling algorithm; and
   transmit the de-queued first Ethernet packet to the egress IO device via an Ethernet switch corresponding to the switch number.

9. The OTN, IP, and Ethernet switching system of claim 1, wherein an FSP of an egress IO device of the set of O IO devices configured to:
   establish a set of O hierarchical virtual input queues (H-VIQs) each comprising a set of O egress-FSP queues (E-FSPQs) and E-VIQs, wherein the uth H-VIQ corresponds to the uth IO device, and wherein the uth E-FSPQ of the uth H-VIQ corresponds to the uth IO device;
   receive a first Ethernet packet including the packet data of the IP packet, second metadata, and a first MAC header at an Ethernet port of the egress IO device;
   determine an ingress IO device of the set of O IO devices based on an E-FSP FIB of the FSP and an internal flow ID of the second metadata of the first Ethernet packet;
   queue the packet data and the second metadata to an E-FSPQ of an H-VIQ corresponding respectively to the ingress IO device and the IO port of the egress IO device;
   de-queue the packet data and the second metadata from the E-VIQs of the H-VIQ using a scheduling algorithm; and
   transmit the de-queued packet data and the second metadata to an IOSP of the egress IO device, wherein the IOSP of the egress IO device configured to:

generate the IP packet including the received packet data and packet header information of the second metadata from the received packet data and the second metadata;
queue the IP packet to an E-IOSPQ of the set of W E-IOSPQs corresponding to the egress port of the egress IO device of the second metadata; and
de-queue the IP packet data from the E-IOSPQ using the scheduling algorithm; and
transmit the IP packet via the egress port.

10. The OTN, IP, and Ethernet switching system of claim 9, wherein
each I-IOSPQ of the set of O I-IOSPQs of each H-VOQ of the set M H-VOQs of an IOSP of each IO device of the set of O IO devices comprising a set of P priority I-IOSPQs, wherein packet data in each I-IOSPQ is de-queued using the scheduling algorithm, wherein
the I-VOQs of each H-VOQ of the set M H-VOQs of the IOSP of each IO device of the set of O IO devices comprising a set of P priority I-VOQs, wherein packet data in the I-VOQs is de-queued using the scheduling algorithm, wherein
each I-FSPQ of the set of M I-FSPQs of the FSP of each IO device of the set of O IO devices comprising a set of P priority I-FSPQs, wherein packet data in each I-FSPQ is de-queued using the scheduling algorithm, wherein
each E-FSPQ of the set of O E-FSPQs of each H-VIQs of the set O H-VIQs of an FSP of each IO device of the set of O IO devices comprising a set of P Priority E-FSPQs, wherein packet data in each E-FSPQ is de-queued using the scheduling algorithm, wherein
the E-VIQs of each H-VIQ of the set N H-VIQs of the FSP of each IO device of the set of O IO devices comprising a set of P priority E-VIQs, wherein packet data in the E-VIQs is de-queued using the scheduling algorithm, and wherein the scheduling algorithm comprises a strict priority algorithm, a weighted fair queuing algorithm, a weighted round robin algorithm, a strict priority and weighted fair queuing algorithm, or a strict priority weighted round robin algorithm.

11. The OTN, IP, and Ethernet switching system of claim 1, wherein an IOSP of each IO device of the set of O IO devices configured to:
establish quantize congestion notification (QCN) between each I-IOSPQ of each H-VOQ of the set of M H-VOQs of the IOSP of each IO device of the set of O IO devices and each corresponding E-FSPQ of each H-VIQ of a set of O H-VIQs of an FSP of each IO device of the set of O IO devices, and wherein
packet data in each I-IOSPQ of the set of O I-IOSPQs of each H-VOQ of the set M H-VOQs of the IOSP of each IO device of the set of O IO devices is de-queued using a scheduling algorithm based on the established QCN.

12. The OTN, IP, and Ethernet switching system of claim 1, wherein an IOSP of each IO device of the set of O IO devices configured to:
establish priority-based flow control (PFC) between each I-FSPQ of a subset of R I-FSPQs of the M I-FSPQs of the FSP of each IO device of the set of O IO devices and switch queues of a corresponding subset of R Ethernet switches of the set of M Ethernet switches, wherein a variable y having a value ranging from 2 to N−1 to denote the yth I-FSPQ of the subset of R I-FSPQs, and wherein
packet data in each I-FSPQ of the subset of R I-FSPQs of the M I-FSPQs of the FSP of each IO device of the set of O IO devices is de-queued using a scheduling algorithm based on the established PFC.

13. The OTN, IP, and Ethernet switching system of claim 1, further comprising:
a virtual switch fabric including a set of N virtual line card slots each comprises a logical aggregation of the jth switch port of the set of N switch ports of each of the set of M Ethernet switches, wherein the uth IO device of the set of O IO devices associated with only the uth virtual line card slot of the N virtual line card slots, and wherein the with O-leaf PIU module of the set of Q O-leaf PIU module associated with only the O+vth virtual line card slot of the N virtual line card slots.

14. The OTN, IP, and Ethernet switching system of claim 1, an FSP of an egress IO device of the set of O IO devices configured to:
establish a set of O E-VIQs, wherein the uth E-VIQ corresponds to the uth IO device;
receive packet data and second metadata at an Ethernet port of the egress IO device;
determine an ingress IO device of the set of O IO devices based on an E-FSP FIB of the FSP and an internal flow ID of the second metadata;
queue the packet data and the second metadata to an E-VIQs corresponding respectively to the IO port of the egress IO device;
de-queue the packet data and the second metadata from the E-VIQs using a scheduling algorithm; and
transmit the de-queued packet data and the second metadata to an IOSP of the egress IO device, wherein
the IOSP of the egress device configured to:
queue the packet data and packet header information of the second metadata to an E-IOSPQ of a set of W E-IOSPQs corresponding to the egress port of the egress IO device of the second metadata; and
de-queue the packet data and the packet header information from the E-IOSPQ using the scheduling algorithm; and
transmit the packet data and the packet header information via the egress port.

15. The OTN, IP, and Ethernet switching system of claim 1, wherein an IOSP of each IO device of the set of O IO devices configured to:
establish quantize congestion notification (QCN) between each I-IOSPQ of each H-VOQ of the set of M H-VOQs of the IOSP of each IO device of the set of O IO devices and each E-VIQ of a set of O E-VIQs of an FSP of each IO device of the set of O IO devices, and wherein
packet data in each I-IOSPQ of the set of O I-IOSPQs of each H-VOQ of the set M H-VOQs of the IOSP of each IO device of the set of O IO devices is de-queued using a scheduling algorithm based on the established QCN.

16. The OTN, IP, and Ethernet switching system of claim 1, wherein an IOSP of each IO device of the set of O IO devices configured to:
establish priority-based flow control (PFC) between each I-FSPQ of a subset of R I-FSPQs of the M I-FSPQs of the FSP of each IO device of the set of O IO devices and switch queues of a corresponding subset of R Ethernet switches of the set of M Ethernet switches, wherein a variable y having a value ranging from 2 to O−1 to denote the yth I-FSPQ of the subset of R I-FSPQs, and wherein
packet data in each I-FSPQ of the subset of R I-FSPQs of the M I-FSPQs of the FSP of each IO device of the set of O IO devices is de-queued using a scheduling algorithm based on the established PFC.

17. The OTN, IP, and Ethernet switching system of claim 1, an FSP of an egress IO device of the set of O IO devices configured to:
- establish a set of W E-VIQs, wherein a variable x having a value ranging from 1 to W to denote the xth E-VIQs of the set of W E-VIQ;
- receive packet data and second metadata at an Ethernet port of the egress IO device;
- determine an ingress IO device of the set of O IO devices based on an E-FSP FIB of the FSP and an internal flow ID of the second metadata;
- queue the packet data and the second metadata to an E-VIQs corresponding respectively to an IO port of the egress IO device;
- de-queue the packet data and the second metadata from the E-VIQs using a scheduling algorithm; and
- transmit the de-queued packet data and the second metadata to an IOSP of the egress IO device, wherein the IOSP configured to:
  - queue the packet data and packet header information of the second metadata to an E-IOSPQ of a set of W E-IOSPQs corresponding to the egress port of the egress IO device of the second metadata; and
  - de-queue the packet data and the packet header information from the E-IOSPQ using the scheduling algorithm; and
  - transmit the packet data and the packet header information via the egress port.

18. The OTN, IP, and Ethernet switching system of claim 1, wherein an IOSP of each IO device of the set of O IO devices configured to:
- establish priority-based flow control (PFC) between each I-FSPQ of M I-FSPQs of the FSP of each IO device of the set of O IO devices and switch queues of a corresponding set of M Ethernet switches, wherein
- packet data in each I-FSPQ of the M I-FSPQs of the FSP of each IO device of the set of O IO devices is de-queued using a scheduling algorithm based on the established PFC.

19. A method, the method comprising: in an optical transport network (OTN), Internet Protocol (IP), and Ethernet switching system comprising:
- an Ethernet fabric including a set of M Ethernet switches each comprising a set of N switch ports, wherein a variable i having a value ranging from 1 to M to denote the ith Ethernet switch of the set of M Ethernet switches and a variable j having a value ranging from 1 to N to denote the jth switch port of the set of N switch ports;
- a set of O input/output (IO) devices each comprising:
- a set of M Ethernet ports, wherein a variable u having a value ranging from 1 to O to denote the uth IO device of the set of O IO devices, and wherein the jth Ethernet port of the uth IO device is connected to the uth switch port of the ith Ethernet switch; and
- an IO side packet processor (IOSP),
- establishing, by the IOSP, a set of M hierarchical virtual output queues (H-VOQs) each comprising a set of N ingress-IOSP queues (I-IOSPQs) and I-VOQs;
- creating, by the IOSP, M virtual lanes (v-lanes) corresponding to a respective H-VOQ of the set of M H-VOQs, the M v-lanes including a first v-lane and a second v-lane;
- creating, by the IOSP, A equal cost multi-path (ECMP) pipes including B ECMP pipes and C ECMP pipes, each of the A ECMP pipes connects to one of the M v-lanes, each of the B ECMP pipes connects to the first v-lane, and each of the C ECMP pipes connects to the second v-lane;
- generating, by the IOSP, micro-flows by 5-Tuple look-up based on packet header information of a received IP packet and an I-IOSP forwarding information base (FIB);
- distributing, by the IOSP, the micro-flows into the A ECMP pipes; and
- queueing, by the IOSP, the IP packet including first metadata to an I-IOSPQ of an H-VOQ corresponding to an egress IO device and a switch number of a corresponding Ethernet switch based on the micro-flows and an identified micro-flow for an ECMP hash key in a ECMP pipe hash of the IOSP.

20. The method of claim 15, wherein the method further comprising:
- in the OTN, IP, and Ethernet switching system further comprising:
- a set of Q optical transport network leaf (O-leaf) plug-in universal (PIU) modules including a first O-leaf PIU module and a second O-leaf PIU module, each O-leaf PIU module of the set of Q O-leaf PIU modules comprising a set of L Ethernet ports, wherein a variable v having a value ranging from 1 to Q to denote the vth O-leaf PIU module, a variable z having a value ranging from 1 to L to denote the zth Ethernet port, and a variable g having a value ranging from 1+H to M to denote the gth Ethernet switch, and wherein the zth Ethernet port of the set of L Ethernet ports of the vth O-leaf PIU module is connected to the O+vth switch port of the set of N switch ports of the gth Ethernet switch,
- establishing, by the first O-leaf PIU module, a first optical data unit (ODU) switched connection from the first O-leaf PIU module to the second O-leaf PIU module via the subset of L Ethernet switches of the M Ethernet switches;
- selecting, by the first O-leaf PIU module, a first sequential order of the subset of L Ethernet switches;
- receiving, by the first O-leaf PIU module, a first ODU at the first O-leaf PIU module and generate a second Ethernet packet corresponding to the first ODU, wherein the first ODU is for transmission via the first ODU switched connection; and
- transmitting, by the first O-leaf PIU module, the second Ethernet packet from a first Ethernet port of the set of L Ethernet ports of the first O-leaf PIU module, wherein the first Ethernet port is selected based on the first sequential order.

* * * * *